United States Patent
Trundle et al.

(10) Patent No.: US 10,356,192 B1
(45) Date of Patent: *Jul. 16, 2019

(54) PROVIDING ELECTRONIC CONTENT BASED ON SENSOR DATA

(71) Applicant: Alarm.com Incorporated, Tysons, VA (US)

(72) Inventors: Stephen Scott Trundle, Falls Church, VA (US); Jean-Paul Martin, Oakton, VA (US); Alison Jane Slavin, Vienna, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/853,333

(22) Filed: Dec. 22, 2017

Related U.S. Application Data

(63) Continuation of application No. 15/357,514, filed on Nov. 21, 2016, now Pat. No. 9,854,050, which is a continuation of application No. 14/921,123, filed on Oct. 23, 2015, now Pat. No. 9,503,539, which is a continuation of application No. 14/186,670, filed on Feb. 21, 2014, now Pat. No. 9,171,321, which is a continuation of application No. 13/970,202, filed on Aug. 19, 2013, now Pat. No. 8,659,417, which is a continuation of application No. 13/875,929, filed on May 2, 2013, now Pat. No. 8,525,665, which is a
(Continued)

(51) Int. Cl.
*H04L 29/08* (2006.01)
*G06Q 30/02* (2012.01)

(52) U.S. Cl.
CPC .............. *H04L 67/22* (2013.01); *H04L 67/12* (2013.01); *G06Q 30/0271* (2013.01); *G06Q 30/0272* (2013.01); *G06Q 30/0273* (2013.01)

(58) Field of Classification Search
CPC .......... G06Q 30/0271; G06Q 30/0272; G06Q 30/0273
USPC ................................. 340/517, 537.15, 573.1
See application file for complete search history.

(56) References Cited

U.S. PATENT DOCUMENTS 6,385,592 B1 * 5/2002 Angles .................. G06Q 30/02
705/14.56
6,400,265 B1 * 6/2002 Saylor .............. G08B 13/19602
340/506
(Continued)

OTHER PUBLICATIONS

U.S. (Non-Final) Action for U.S. Appl. No. 12/255,919, dated Dec. 9, 2011, 20 pages.
(Continued)

*Primary Examiner* — Joseph H Feild
*Assistant Examiner* — Rufus C Point
(74) *Attorney, Agent, or Firm* — Fish & Richardson P.C.

(57) ABSTRACT

Techniques are described for using sensor data derived from a monitoring system to drive personalized content. Sensor data captured by a monitoring system may be used to determine attributes of users of the monitoring system and/or attributes of a property monitored by the monitoring system. The determined attributes may be used to select content to present to users of the monitoring system. Content presentation may be made through the monitoring system and may be triggered based on events detected by the monitoring system.

18 Claims, 11 Drawing Sheets

Related U.S. Application Data continuation of application No. 12/255,919, filed on Oct. 22, 2008, now Pat. No. 8,456,293.

(60) Provisional application No. 61/021,585, filed on Jan. 16, 2008, provisional application No. 60/981,758, filed on Oct. 22, 2007, provisional application No. 60/981,754, filed on Oct. 22, 2007.

(56) References Cited

U.S. PATENT DOCUMENTS

| | | | | |
|---|---|---|---|---|
| 7,015,806 B2 * | 3/2006 | Naidoo | ............ | G08B 13/19656 340/506 |
| 7,119,716 B2 * | 10/2006 | Horstemeyer | ........ | B60R 25/102 340/994 |
| 7,127,429 B2 * | 10/2006 | Kang | ...................... | G06F 21/10 705/54 |
| 8,456,293 B1 * | 6/2013 | Trundle | ............. | G08B 21/0423 340/517 |
| 8,525,665 B1 * | 9/2013 | Trundle | ............. | G08B 21/0423 340/517 |
| 8,659,417 B1 * | 2/2014 | Trundle | ............. | G08B 21/0423 340/517 |
| 8,702,607 B2 * | 4/2014 | LeBoeuf | ................ | G16H 50/30 600/301 |
| 2002/0005894 A1 * | 1/2002 | Foodman | ......... | G08B 13/19645 348/143 |
| 2003/0006911 A1 * | 1/2003 | Smith | .................... | G06Q 30/02 340/988 |
| 2004/0135671 A1 * | 7/2004 | Khoshbin | .............. | G06Q 20/04 340/7.53 |
| 2004/0243450 A1 * | 12/2004 | Bernard, Jr. | ........... | G06Q 40/02 705/4 |
| 2007/0016476 A1 * | 1/2007 | Hoffberg | ................ | G05B 15/02 705/14.64 |
| 2008/0120181 A1 * | 5/2008 | Chang | .................... | G06Q 30/02 705/14.61 |
| 2008/0249868 A1 * | 10/2008 | Angell | .................... | G06Q 30/02 705/14.53 |
| 2009/0083122 A1 * | 3/2009 | Angell | ............... | G06Q 10/0631 705/7.33 |
| 2010/0169910 A1 * | 7/2010 | Collins | .............. | G06Q 30/0251 725/14 |

OTHER PUBLICATIONS

U.S. (Final) Action for U.S. Appl. No. 12/255,919, dated Jun. 11, 2012, 26 pages.
U.S. Notice of Allowance for U.S. Appl. No. 12/255,919, dated Apr. 15, 2013, 22 pages.
U.S. Notice of Allowance for U.S. Appl. No. 13/875,929, dated Jul. 19, 2013, 14 pages.
U.S. Notice of Allowance for U.S. Appl. No. 13/970,202 dated Oct. 28, 2013, 16 pages.

* cited by examiner

Advertisement Criteria — 534

- 571 — Brand/Product: Pizza Delivery
- 572 — Geographic Region: USA
- 573 — Targeted Gender: None
- 574 — At Home: Required
- 575 — Working Empty Nester: Undesired
- 576 — Children: Desired
- 577 — Just Home, No Dinner: Required
- 578 — Currently Relaxed: Undesired
- 579 — Large Home: Irrelevant

Fig. 5C

Customer Profile — 532

- 561 — Name: John Doe
- 562 — Address: Washington, D.C., 20005
- 563 — Gender: Male
- 564 — At Home: Yes
- 565 — Working Empty Nester: No
- 566 — Children: School Age Children
- 567 — Just Home, No Dinner: Yes
- 568 — Currently Relaxed: No
- 569 — Large Home: No

Fig. 5B

PROVIDING ELECTRONIC CONTENT BASED ON SENSOR DATA

CROSS REFERENCE TO RELATED APPLICATIONS

This application is a continuation (and claims the benefit of priority under 35 USC § 120) of U.S. patent application Ser. No. 15/357,514, filed Nov. 21, 2016, now allowed, which is a continuation of U.S. application Ser. No. 14/921,123, filed Oct. 23, 2015, now U.S. Pat. No. 9,503,539, issued Nov. 22, 2016, which is a continuation of U.S. application Ser. No. 14/186,670, filed Feb. 21, 2014, now U.S. Pat. No. 9,171,321, which is a continuation of U.S. application Ser. No. 13/970,202, filed Aug. 19, 2013, now U.S. Pat. No. 8,659,417, issued Feb. 25, 2014, which is a continuation of U.S. application Ser. No. 13/875,929, filed May 2, 2013, now U.S. Pat. No. 8,525,665, issued Sep. 3, 2013, which is a continuation of U.S. application Ser. No. 12/255,919, filed Oct. 22, 2008, now U.S. Pat. No. 8,456,293, issued Jun. 4, 2013, which claims priority from U.S. Provisional Application No. 60/981,754, filed Oct. 22, 2007, U.S. Provisional Application No. 60/981,758, filed Oct. 22, 2007, and U.S. Provisional Application No. 61/021,585, filed Jan. 16, 2008. The content of each of the prior applications is incorporated herein by reference in their entirety.

TECHNICAL FIELD

This disclosure relates to providing electronic content based on sensor data.

BACKGROUND

Many people equip homes and businesses with alarm systems to provide increased security for their homes and businesses. Alarm systems may include control panels that a person may use to control operation of the alarm system and sensors that monitor for security breaches. In response to an alarm system detecting a security breach, the alarm system may generate an audible alert and, if the alarm system is monitored by a monitoring service, the alarm system may send electronic data to the monitoring service to alert the monitoring service of the security breach.

SUMMARY

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DESCRIPTION OF DRAWINGS

FIG. 5B illustrates an example of a customer profile generated based on information received from a customer and sensor data received from a monitoring system.

FIG. 5C illustrates an example of advertisement criteria used to match advertisements to customers based on customer profiles.

DETAILED DESCRIPTION

Figure 1:
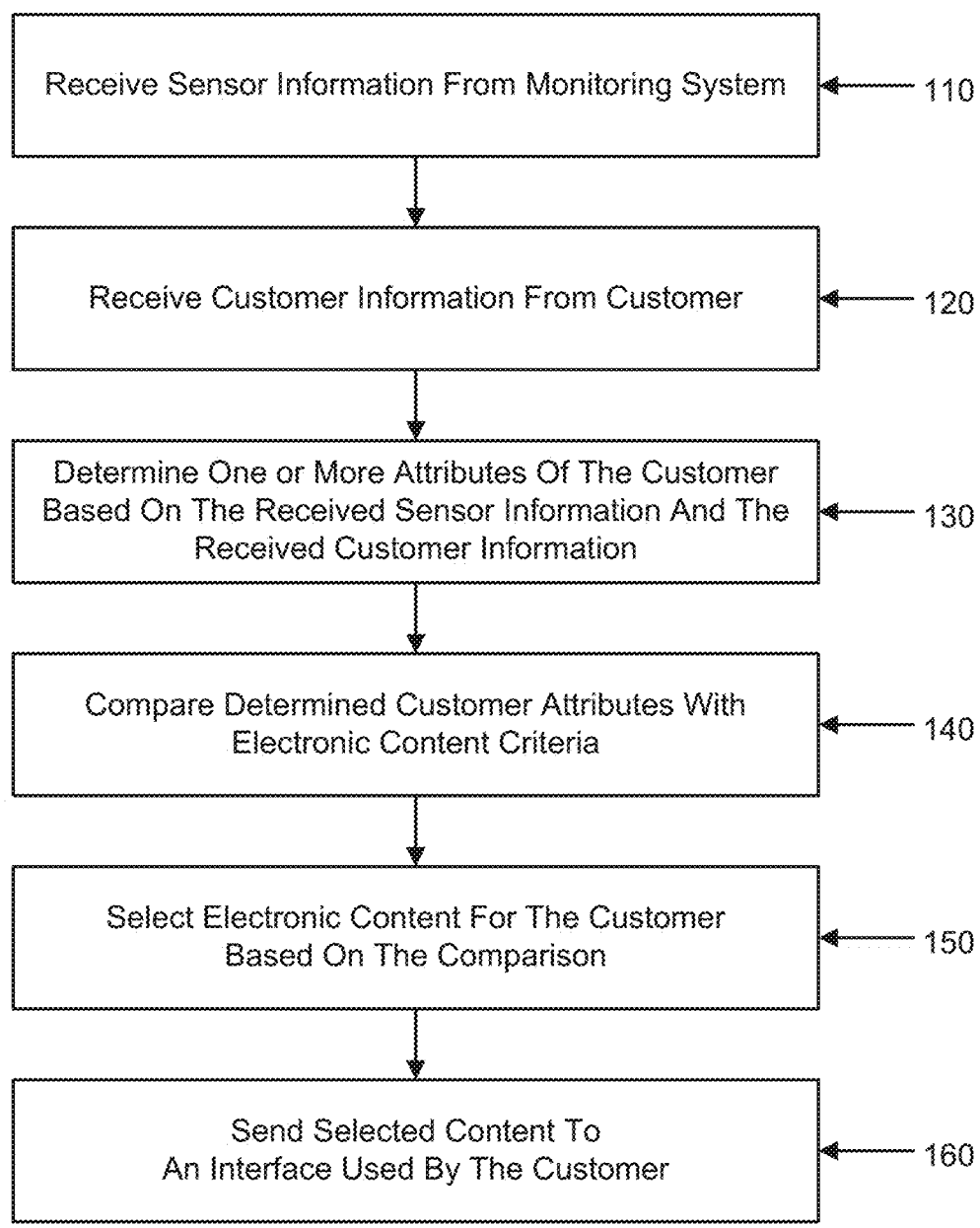
FIG. 1 is a flow chart illustrating an example of a process for providing electronic content based on sensor data.

Techniques are described for using sensor data derived from a monitoring system to drive personalized content. The described techniques may provide for additional monetization of the relationship that monitoring service providers (e.g., security dealers) have with their customers by providing personalized content to customers in a manner that leverages the presence of monitoring equipment (e.g., a capable liquid crystal display (LCD)) in high-traffic areas of a property (e.g., a customer's home) and the greater daily attention given to the monitoring system by customers who regularly interact with the system and receive notifications from it.

In some implementations, an ad revenue model may include a syndicated, geo-coded advertising engine that determines a profile of a monitored property (e.g., home) based on monitoring information obtained via sensor data captured by sensors included in the monitoring system. The profile may be used to provide valuable offers for goods and services that are expected to be of interest to both advertisers offering the goods and services and customers that are receiving the offers.

In these implementations, a detailed profile of a property (e.g., home) serviced by the monitoring service provider (e.g., security dealer) may be developed. The monitoring service provider may track events captured by sensors included in the monitoring system (e.g., patterns of door/window openings, motion sensor detections, analysis of video/photographic camera images, environmental sensor data, energy consumption sensor data, health monitoring sensor data, etc.) and learn aspects of customers that use the property based on the tracked events. For instance, the monitoring service provider may be able to determine whether the customer is home all day (e.g., motion sensors detecting activity throughout the day), whether the customer likely has small children or school-age children (e.g., sensor activity reflects increased activity that corresponds to typical school schedules), whether the customer appears to travel a lot (e.g., frequent periods in which a security system is armed in an away setting for several days), whether the customer likely is part of a two-income family (e.g., sensor activity reflects two individuals coming and going from a home at times consistent with a typical work schedule), how much energy the customer uses (e.g., energy consumption sensor data measures energy use of appliances or other devices in the home), whether the customer appears to frequently go out to dinner (e.g., sensor activity indicates that the customer frequently leaves the home during typical dinner time hours), and whether a senior citizen is living in the home (e.g., presence of health monitoring sensors and/or prescription drugs used by senior citizens). In other examples, the monitoring service provider may be able to determine the freshness of items in the customer's refrigerator, identify products used by the customer, determine the number/type of vehicles owned by the customer and the location of the vehicles, determine the presence of a second home of the customer and its location, and determine the general status of operational and mechanical systems in the home.

Sensor technology may be leveraged to develop the detailed profile of the customer's property and, thereby, may be leveraged in targeting content (e.g., advertisements) to the customer. The richness of physical data related to the customer's interactions in the physical world that a monitoring service provider (e.g., security dealer) is able to capture and leverage to create a detailed profile for targeting electronic content (e.g., advertisements) may exceed, both in accuracy and detail, profile information developed by profiling online behavior and keywords entered by users in an electronic environment.

Using the techniques described throughout the disclosure, a monitoring service provider may use physical sensor data to provide customers with timely and attractive services and offers. In some examples, the concept of a "Daily Discount provided by a [Dealer]" may be provided. Customers may agree to receive one valuable, highly targeted, local coupon per day, directly on an LCD display in or near their kitchen (or through another interface). For example, on Wednesday, the monitoring service provider might track sensor data, and notice that nobody was home from 4:00 pm to 6:00 pm and that someone arrived at 6:15 pm (e.g., motion sensors in the house did not detect motion from 4:00 to 6:00 pm and a front door contact sensor triggered at 6:15 pm). In this example, based on the sensor data, the monitoring service provider determines that the customer might be hungry and without dinner, and present the daily discount of, "Large Pizza from A Local Pizzeria to your front door in 25 minutes with special dealer discount." The daily discount may be announced by a beep of a speaker included in the monitoring system.

Advertisers may pay, on either an impression or "paid click" basis, for example, to present targeted offers to customers local to their business. Accordingly, a monitoring service provider may provide a security sensor driven advertising engine and revenue model that provides personalized, relevant advertisements to customers in a setting in which the customer is likely to perceive the advertisements.

For instance, a security system provider may offer advertisers the ability to provide targeted promotions by zip code, property type, or subscription type to customers who have agreed to receive notifications (or other content) from the security system provider. The security system provider may set standards for each promotional notification and govern notification volume to maintain positive goodwill with its subscribers (e.g., security system customers). The security system provider may allow advertisers to control the timing of advertisements based on events detected by the security system. For instance, advertisements may be timed based on a door or motion sensor detecting that a user has entered a room. Advertisements or other electronic content also may be targeted and provided based on which sensor detects an event. In one example, if a motion/door sensor detects a person entering a bedroom known to be a bedroom of a teenager, the security system may provide an advertisement directed to a teenage audience. In another example, if a motion/door sensor detects a person entering a bedroom known to be a bedroom of an adult, the security system may provide an advertisement directed to an adult audience.

In further implementations, a security system may be configured to offer capabilities that make the security system fully interactive, capable of being controlled remotely through a Web or personal digital assistant (PDA) interface, and capable of allowing a customer to personalize the operation of the security system by, for example, defining their own threats and alerts (e.g., custom threat alerting) for events that are important to the customer, but which may not represent alarm events (e.g., possible intrusions, fires, etc.) that require emergency personnel. For instance, a security system may be configured to allow a user of the security system to receive personalized peer to peer messages, personalized news content, personalized advertisements, or other electronic content through the security system. Security system panels may include a standard, low-cost LCD interface (or other electronic display) and the electronic content may be displayed by the security system on the LCD interface of the panel.

Another user may choose to leave a message for a user of the security system by going to a secure website operated by, for example, a remote alarm or content server, typing in a message, and then instructing the remote system to submit the message to the LCD display when someone enters the property. In this implementation, the remote system may monitor for door sensor and/or motion sensor events that would indicate someone has entered the property, and may send the message and a command to the alarm panel to produce a beep or some other audible notification of the message in response to detecting that the property was accessed.

In some examples, security system features may be leveraged in providing and handling the electronic content. For instance, users may respond to electronic messages sent to the security system using a keypad for the security system and the security system may trigger the display of electronic content based on security system sensors (e.g., display advertisement/news content when a door sensor detects a door being opened or a motion sensor detects presence of a person in a room).

FIG. 1 illustrates an example of a process 100 for providing electronic content based on sensor data. The operations in flow chart 100 are described generally as being performed by a processor. In some implementations, the processor may be included in an electronic device or system configured to send and receive communications over a network. For instance, the processor may be included in a monitoring system, a monitoring application server, or another type of electronic device included in a system configured to monitor sensor data and select electronic content based on the monitored sensor data. The operations of process 100 may be performed by multiple processors included in one or more electronic devices or systems.

The processor receives sensor information from a monitoring system associated with a customer (110). For example, the processor receives, either directly or via a network, data communications from sensors included in the monitoring system that are configured to sense physical attributes of the physical world. The sensor information may include presence monitoring events (e.g., contact sensor data, motion sensor data, video monitoring data, etc.), environmental sensor data (e.g., temperature sensor data, air quality sensor data, water sensor data, etc.), energy consumption sensor data (e.g., energy consumed by a climate control or a heating, ventilating, and air conditioning (HVAC) system), health monitoring sensors (e.g., blood sugar monitors, blood pressure monitors, etc.), radio frequency identification (RFID) sensor data (e.g., RFID tags may be applied to articles (e.g., a car or a prescription bottle) and RFID sensors may detect presence of the articles), or any other sensor data related to physical attributes capable of being monitored using sensor technology. The sensor information may include a single detected event (e.g., a single contact sensor trigger) or series of detected events (e.g., a pattern of contact sensor triggers, a motion sensor trigger, and an RFID tag identification). In addition, the sensor information may be direct data captured by the sensors or may be processed by the monitoring system prior to being received by the processor. The monitoring system may process sensor data by performing statistical calculations on the sensor data to identify trends within the data (e.g., based on sensor data captured during typical work days, a customer leaves the home through the front door on average at 8:26 am and enters the home through the front door on average at 5:38 pm).

The processor receives customer information from the customer (120). For instance, the processor receives, either directly or via a network, customer information entered by the customer through an interface (e.g., a Web interface). The processor also may receive customer information from a third party source, a customer information database, or based on input entered by a data entry technician entering information received from the customer in printed form or in voice communications. The customer information may include data collected during installation or registration of a monitoring system offered by a monitoring service provider. For instance, the customer information may include personal information related to the customer (e.g., name, age, gender, address, employer, etc.) and also may include monitoring or content preferences of the customer (e.g., custom alerts, preferred types of content, preferred content distribution medium, etc.).

In some examples, a user of a security system may personalize the type of information that the user would like to receive (e.g., advertisements, news content, weather content, electronic messages, etc.). For instance, a user may select a particular type of news content or advertising content that the user wishes to receive and the content provided by the security system may be limited to the selected type of content.

A user of the security system also may, via a web site, designate the type of content and frequency of content delivery (including never) by which the user would like to receive information through the security system (e.g., on their LCD display). Types of content may include advertising content, news content, personalized messaging content, or any other type of content available for provision using the security system. The user may identify particular categories of content in which the user is interested (e.g., sports content), and/or brands or products in which the user is interested (e.g., Coca-cola products or soda products).

In some implementations, the user of the security system or an affiliate of the user may program the system through a remote web site to provide the user with a reminder of certain events. For example, the system may be programmed to send the property occupier a message at predetermined times each day to remind them of the need to take a prescription medication.

The customer information further may include monitoring preferences or monitoring equipment preferences of the customer. For example, the customer may indicate that the customer needs a pet sensitive motion sensor. In this example, the monitoring service provider may determine that the customer has a pet and subscribe the customer for pet targeted content (e.g., pet food advertisements, veterinary service advertisements, etc.)

The processor determines one or more attributes of the customer based on the received sensor information and the received customer information (130). For example, the processor may determine a customer profile based on the received sensor information and the received customer information. In this example, the customer profile may include the customer information received from the customer (e.g., name, age, gender, address, employer, etc.) and may include attributes of the customer inferred based on the customer information and/or inferred (or directly observed) based on the sensor data.

For instance, the processor may track sensor data received from the monitoring system and may compare the tracked sensor to patterns or rules that are used to identify attributes of the customer. In one example, the processor may identify patterns of contact sensor events and motion sensor events to identify a schedule of customers leaving and returning to a home monitored by the monitoring system. In this example, the processor may compare the identified schedule to pre-determined typical schedules of customers with particular attributes and determine whether the identified schedule matches one of the pre-determined typical schedules (e.g., if the identified schedule matches a typical school schedule, the processor determines that the customer has school-age children).

In some implementations, the processor may use video image data to confirm attributes inferred using other sensor data or may derive additional attributes using video image data. In these implementations, the processor may analyze images captured by a video camera and use automated analytic techniques to identify customer attributes. For instance, the processor may analyze images captured by the video/photographic camera to detect physical attributes of customers in the household (e.g., height, weight, etc.) and the number of customers in the household. When sensor activity infers that a customer has small children based on contact/motion sensor activity, video image analysis may be used to confirm that an individual with a size and shape of a typical small child is present in the house.

In other examples, products used by the customer may be identified using automated video analysis. In these examples, the processor may analyze video image data to identify common brand names or trademarks on goods used by the customer. For instance, the processor may identify an image of a brand name of a television included in the user's home, compare the image of the brand name to common brand names of television manufacturers, and determine the brand name of the television being used by the user based on the comparison. The processor also may identify brands or types of products used by the customer. As one example, the processor may analyze images of a customer making a peanut butter and jelly sandwich and detect that the customer is using a generic brand of peanut butter and that the jar being used by the customer is nearly empty. In this example, the processor may determine to provide an advertisement, from a brand name peanut butter manufacturer, that includes a discount coupon and that indicates that the price of the brand name peanut butter with the discount coupon is less than a typical price of generic brand peanut butter.

The processor also may use a combination of the received customer information and the received sensor information to identify attributes of the customer. For example, the processor may use the age of the customer provided in the customer information in combination with physical sensor data to infer an attribute of a customer. In this example, the processor may determine that a person is retired when the age of the customer provided in the customer information is greater than sixty years old and sensor data indicates that the customer is frequently present in the home during the day. In another example, the processor may determine that a person is on disability leave when the age of the customer provided in the customer information is less than fifty years old, sensor data indicates that the customer is frequently present in the home during the day, and health monitoring sensors are monitoring a medical condition of the customer.

Furthermore, the processor may infer aspects of the customer's property based on a combination of the received customer information and the received sensor information. For instance, the customer information may indicate that the customer needs a pet sensitive motion sensor and the sensor data may track the customer leaving and returning to home through a front door for several relatively short periods (e.g., 5 to 10 minutes) during the day. Based on this data, the processor may determine that the pet of the customer is a dog that the customer is taking on walks to go to the bathroom and, therefore, infer that the customer owns a dog and target dog-related content to the customer. The processor also may infer that the customer does not have a fenced-in yard because the customer is frequently taking the dog on walks to go to the bathroom. In this case, the processor may target advertisements for fencing installation companies to the customer, but avoid providing advertisements from fence painting companies to the customer unless the customer's monitored behavior changes in a manner that suggests the customer has installed a fence (e.g., times corresponding to when the customer walked the dog are replaced by opening and closing of a rear door of the customer's house).

The processor compares the determined customer attributes with electronic content criteria (140). For instance, the processor compares attributes of the customer included in a determined customer profile to criteria that is associated with available electronic content and that defines attributes of customers to which the content is targeted. The available electronic content may include advertisement content, news content, entertainment content, or any other type of content the processor is capable of delivering.

The processor selects electronic content for the customer based on the comparison of the determined customer attributes with electronic content criteria (150). For example, based on the comparison, the processor identifies the available electronic content that most closely matches the customer attributes included in the customer's profile and selects the identified content. In this example, the processor uses information known or inferred about the customer to attempt to select content that the processor expects to match the interests of the customer.

The processor sends the selected electronic content to an interface used by the customer (160). The processor may send the selected electronic content to any type of interface used by the customer over any type of communication medium. The interface may be a display interface and the selected content may be visual content. The interface also may be a speaker interface and the selected content may be audio content. In addition, the processor may send the selected electronic content over a wired or wireless network (e.g., the Internet) using any type of communication protocol. For instance, the selected electronic content may be delivered as an email message, a short messaging service (SMS) or text message, an instant message, or using any other type of messaging protocol.

In some examples, the selected electronic content is sent to the monitoring system for presentation on an interface controlled by the monitoring system (e.g., an electronic display in an alarm panel, a speaker included in the monitoring system, another electronic display device controlled by the monitoring system). In these examples, the monitoring system may present the electronic content upon receipt or may store the electronic content for later presentation in response to a detected physical event. For instance, the monitoring system may store the content and present the content in response to detecting a door being opened after 2:00 pm. The monitoring system may store multiple instances of selected content and chose which content to present and where to present the content based on a type of event detected and a time associated with the detected event.

Rich sensor data sets may be used to determine what content is relevant for delivery to the customer, when to deliver the relevant content, and where to deliver the relevant content. The relevant content may be delivered, for example, the first time a door is opened after system installation. The content also may be delivered, for example, upon detection of the first door opening on a Saturday morning, or upon detection of the first disarm event of the weekend.

Using the techniques described above with respect to FIG. 1, a remote content provisioning system may automatically personalize the information that is delivered to a customer of a monitoring system. For instance, a remote content server may know the location of the monitoring system and provide weather alert content that is unique to that location. In some examples, the remote content server may target advertisements to the monitoring system based on information known about the user of the security system (e.g., information gathered during purchases of the security system) or aggregated information related to the response to monitoring system advertisements provided through monitoring systems of other users that are located in a similar geographic area or users that share other common characteristics. The remote content server may provide the user with updated traffic alerts or driving direction information through the monitoring system when the monitoring system detects that the user is leaving his or her house.

Further, the remote content server may provide the user with homeland security or other critical alerts (e.g., severe weather, alerts covered by an Emergency Broadcast System, etc.). For instance, the remote content server may provide alerts related to terrorist attacks and provide instructions for how people should respond to the attacks (e.g., stay in home, evacuate, etc.). The monitoring system may be configured to receive alert messages even when the main power supply is out and communication of alert messages to monitoring systems may be prioritized by communication providers in emergency situations.

A message from a remote content provider may be designed so that the provider causes a speaker in the monitoring system (e.g., a speaker in an alarm panel) to beep or emit some other audible notification one or multiple times to indicate to the user that a message (or other content) has been received. In some implementations, other types of alerts may be used to notify a user that a message (or other content) has been received and multiple types of alerts may be provided to enable the user to determine the type or level of urgency of the message (or other content). For example, the security system may not emit any audible notification or beep when general news content is received, may emit a single audible notification or beep when a normal electronic message is received, may emit two successive audible notifications or beep when a message marked with high importance is received, and may fully activate the alarm siren when an emergency broadcast system or other critical alert is received. The tone or volume of the audible notification or beep also may change to distinguish different types of messages. Other alerting mechanisms may be used and the alert may be provided throughout a building being monitored by the monitoring system or through a client device of the user (e.g., a computer, a phone, a PDA, etc.).

A monitoring system provider may remotely send an alert message to the monitoring system for display on, for example, an LCD display on a control panel. The alert message may remind the customer to do things such as test their system or pay their monitoring bill. The monitoring system may be configured to provide the user with a message to activate the monitoring function of the security system if the security system is not activated at a particular time of night.

Figure 2:
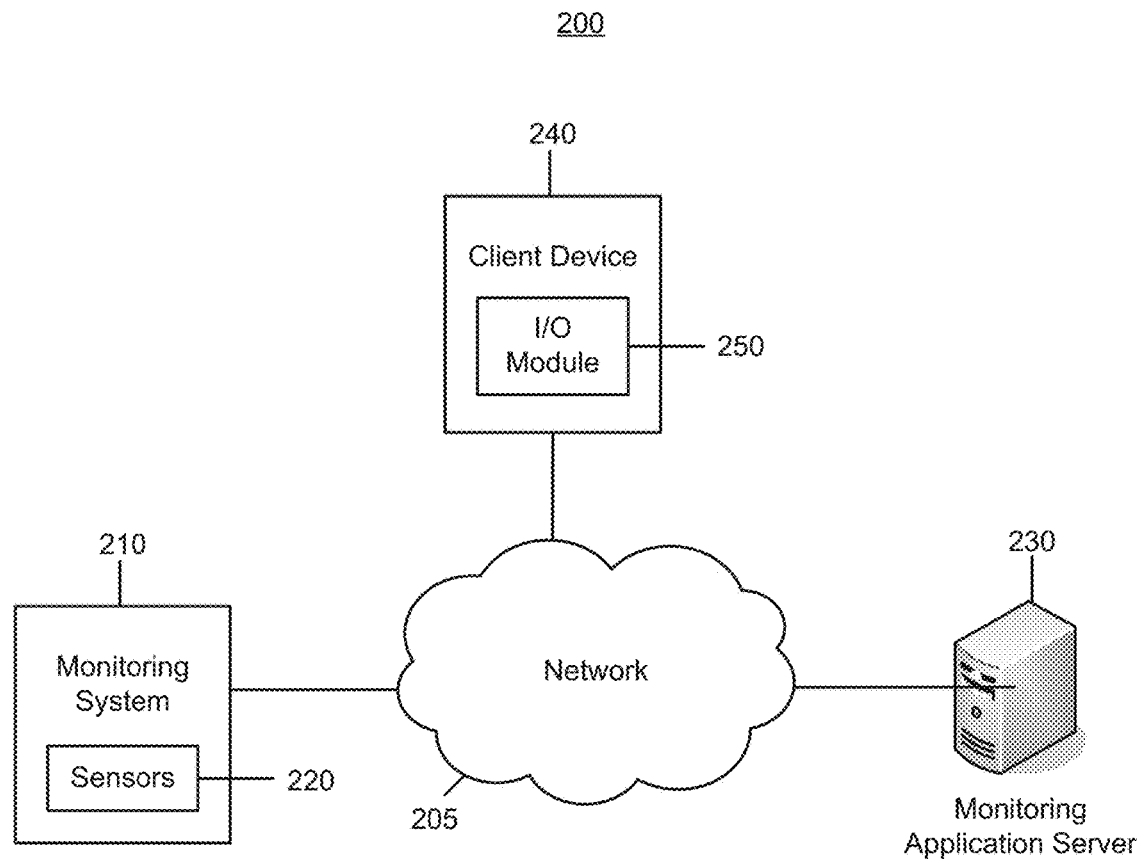
FIGS. 2 and 3 are block diagrams of example electronic systems configured to provide electronic content based on sensor data.

FIG. 2 illustrates an example of an electronic system 200 configured to provide electronic content based on sensor data. The electronic system 200 includes a network 205, a monitoring system 210, a monitoring application server 230, and a client device 240. The network 205 facilitates communications between the monitoring system 210, the monitoring application server 230, and the client device 240.

The network 205 is configured to enable exchange of electronic communications between devices connected to the network 205. For example, the network 205 may be configured to enable exchange of electronic communications between the monitoring system 210, the monitoring application server 230, and the client device 240. The network 205 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 205 may include multiple networks or subnetworks, each of which may include, for example, a wired or wireless data pathway. The network 205 may include a circuit-switched network, a packet-switched data network, or any other network able to carry electronic communications (e.g., data or voice communications). For example, the network 205 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 205 may include one or more networks that include wireless data channels and wireless voice channels.

The monitoring system 210 may be any type of electronic system that includes at least one sensor 220 configured to sense at least one physical attribute. The monitoring system 210 may be an alarm system, a security system, a personal emergency response system, etc. In some implementations, the monitoring system 210 includes a control unit or processor configured to receive sensor data from the at least one sensor 220, process the received sensor data, and send, over the network 205, data communications to devices connected to the network 205 based on the sensor data. In other implementations, at least one sensor 220 communicates, over the network 205, sensor data directly to devices connected to the network 205. In these implementations, the at least one sensor 220 may use radio frequency (RF) technology to communicate directly with other devices. The monitoring system 210 may be a collection of sensors 220, which monitor the state of a property.

The at least one sensor 220 may include a contact sensor, a motion sensor, a glass break sensor, or any other type of sensor included in an alarm system or security system. The at least one sensor also may include an environmental sensor, such as a temperature sensor, a water sensor, a rain sensor, a wind sensor, a light sensor, a smoke detector, a carbon monoxide detector, an air quality sensor, etc. The at least one sensor further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the at least one sensor may include a radio-frequency identification (RFID) sensor that identifies a particular article that includes a pre-assigned RFID tag. In addition, the at least one sensor may include a video/photographic camera or other type of optical sensing device configured to capture images and may include an energy consumption sensor for appliances and devices in a property monitored by the monitoring system 210.

The monitoring application server 230 is an electronic device configured to execute programs and exchange communications with the monitoring system 210 and the client device 240 over the network 205. For example, the monitoring application server 230 may be configured to execute a program that provides monitoring services and provides personalized relevant electronic content based on sensor data received from the monitoring system 210. In this example, the monitoring application server 230 may exchange communications with the monitoring system 210 to receive sensor data and may exchange communications with the client device 240 to present, to a user, personalized relevant electronic content that is selected based on the received sensor data.

The monitoring application server 230 may provide an email address (or other communication address) which may be used by others to send messages to the monitoring system 210 or the client device 240. The monitoring application server 230 may receive messages and deliver the messages to the customer of the monitoring system 210. The message recipient of the message sent to the monitoring system 210 may be allowed to respond to the message using the monitoring system 210 in a variety of ways. For example, the message recipient may key in a response on the control panel keypad, may hit a button to activate the panel speaker and then speak a response which is relayed through the monitoring application server 230 to the original message author (or converted to text and sent to the original message author), or use the panel speaker to create a phone call between the person at the control panel and another person at a designated phone number.

The client device 240 may be a general-purpose computer (e.g., a desktop personal computer, a workstation, or a laptop computer) that is configured to communicate with the monitoring application server 230 over the network 205. In some implementations, the client device 240 may be a mobile or wireless device or a device designed for a specific function. For example, the client device 240 may include a cell phone, a smart phone, a tablet PC, a personal digital assistant (PDA), or any other portable device configured to communicate over a network and display information. For instance, the client device 240 also may include a portable email communication device, an electronic organizer, a portable music player, another type of communication device, and a handheld or portable electronic device for gaming, communications, and/or data organization.

The client device 240 may be configured to interact with a user interface provided by the monitoring application server 230. For example, the client device 240 may be configured to display a user interface (e.g., a web page) provided by the monitoring application server 230 that enables a user to input data associated with the monitoring system 210 and content provided by the monitoring application server 230. In this example, the user may control the monitoring system 210 using the client device 240.

In some implementations, the client device 240 is connected to the monitoring system 210 and may receive content through the monitoring system 210. In these implementations, the client device 240 may be an alarm panel included in the monitoring system 210 or may be a television (or other device with an electronic display) included in a property monitored by the monitoring system 210.

The client device 240 includes an input/output (I/O) device 250, which is configured to receive user input and provide output. For example, the I/O device 250 may include a mouse, a keyboard, a stylus, a touch screen, a track ball, a toggle control, one or more user input buttons, a microphone, or any other device that allows a user to input data into the client device 240 or otherwise communicate with the client device 240.

The I/O device 250 also may include a device configured to output content. For instance, the I/O device 250 may include a display device configured to display graphical user interfaces that enable a user to perceive electronic content or monitoring system 210 alerts. The I/O device 250 also may include a speaker configured to provide audible output related to electronic content or monitoring system 210 alerts.

Figure 3:
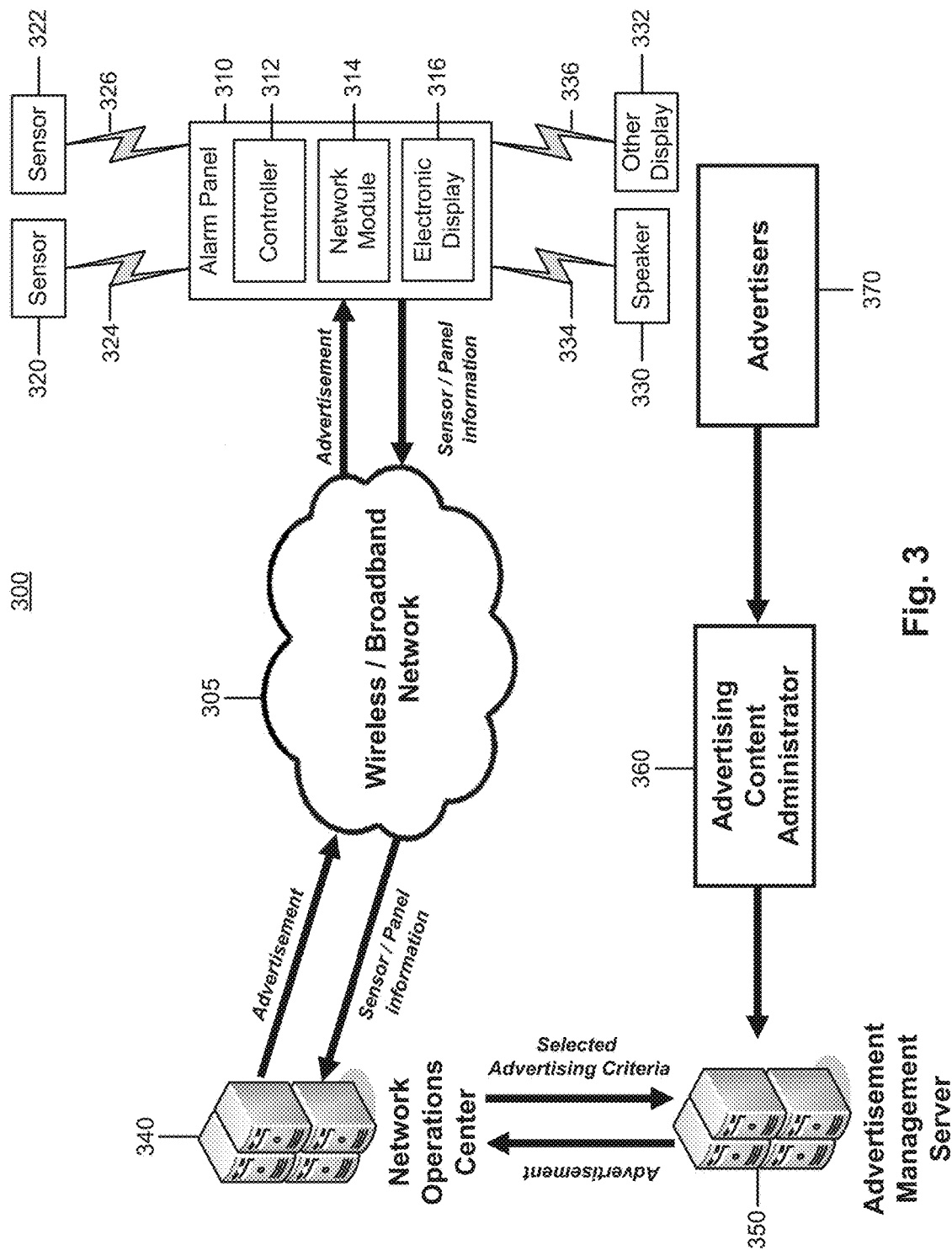

FIG. 3 illustrates another example of an electronic system 300 configured to provide electronic content based on sensor data. The electronic system 300 includes a network 305, an alarm panel 310, an network operations center 340, and an advertisement management server 350. The network 305 facilitates communications between the alarm panel 310 and the network operations center 340.

The network 305 is configured to enable exchange of electronic communications between devices connected to the network 305. The network 305 may be a wireless network, a broadband network, or a combination of networks including a wireless network and a broadband network. In some implementations, the network 305 may be similar to the network 205 described above with respect to FIG. 2.

The alarm panel 310 includes a controller 312, a network module 314, and an electronic display 316. The controller 312 is configured to control an alarm system that includes the alarm panel 310. In some examples, the controller 312 may include a processor or other control circuitry configured to execute instructions of a program that controls operation of an alarm system. In these examples, the controller 312 may be configured to receive input from sensors, detectors, or other devices included in the alarm system and control operations of devices included in the alarm system. For example, the controller 312 may be configured to control operation of the network module 314, and the electronic display 316 included in the alarm panel 310.

The network module 314 is a communication device configured to exchange communications over the network 305. The network module 314 may be a wireless communication module configured to exchange wireless communications over the network 305. For example, the network module 314 may be a wireless communication device configured to exchange communications over a wireless data channel and a wireless voice channel. In this example, the network module 314 may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: GSM or GPRS, CDMA, EDGE or EGPRS, EV-DO or EVDO, UMTS, or IP.

The network module 314 also may be a wired communication module configured to exchange communications over the network 305 using a wired connection. For instance, the network module 314 may be a modem, a network interface card, or another other type of network interface device. The network module 314 may be an Ethernet network card configured to enable the alarm panel to communicate over a local area network and/or the Internet. The network module 314 also may be a voiceband modem configured to enable the alarm panel to communicate over the telephone lines of Plain Old Telephone Systems (POTS).

The alarm panel 310 includes an electronic display 316. The electronic display 316 may be any type of electronic display configured to render a visually perceivable display of information (e.g., an LCD display, a plasma display, etc.). The electronic display 316 may be used to depict the current state of the alarm system. For example, the LCD display may display words like "System Disarmed 6:42 pm", or "Enter User Code to Disarm", or "Front Door Opened". The electronic display 316 also may be used to display electronic content, such as advertisement content, news content, weather content, and entertainment content.

The alarm system that includes the alarm panel 310 includes one or more sensors or detectors. For example, the alarm system may include multiple sensors 320 and 322. The sensors 320 and 322 may be contact sensors, motion sensors, glass breaker sensors, temperature sensors, smoke sensors, carbon monoxide sensors, panic button sensors, or any other type of sensor that senses an environmental or physical condition. The sensors 320 and 322 communicate with the controller 312 over communication links 324 and 326. The communication links 324 and 326 may be a wired or wireless data pathway configured to transmit signals from the sensors 320 and 322 to the controller 312. The sensors 320 and 322 may continuously transmit sensed values to the controller 312, periodically transmit sensed values to the controller 312, or transmit sensed values to the controller 312 in response to a change in a sensed value. The controller 312 may receive signals from the sensors 320 and 322 and detect an alarm event based on the sensed values. For example, the sensor 320 may be a contact sensor provided on a door to a residence and the communication link 324 may be a wireless connection between the sensor 320 and the controller 312. In this example, the sensor 220 may sense that the door has been opened (e.g., absence of a connection between contacts included as part of the sensor) and wirelessly transmit data over communication link 324 to the controller 312 indicating that the door has been opened. The controller 312 receives the data from the sensor 320 over the communication link 324 and determines that an alarm event (e.g., the door opened) has occurred based on the signal from the sensor 320. The controller 312 controls operation of the alarm system based on the determination that the alarm event has occurred.

The alarm system also includes a speaker 330. The speaker 330 may include an electromechanical transducer that converts an electrical signal into sound. The speaker 330 may receive an electrical signal from the controller 312 and produce an audible output based on the electrical signal. For example, the controller 312, in response to detecting an alarm event, may send a signal to the speaker 330 to cause the speaker to produce an audible alarm sound. The speaker 330 also may output audio messages (e.g., audio advertisements, broadcast audio alerts, etc.). In another example, the controller 312 may send a signal representative of a voice communication to the speaker 330 to cause the speaker to produce an audible output of the voice communication. In this example, the controller 312 may control the network module 314 to establish a voice communication session over a wireless voice channel and provide an electrical signal to the speaker 330 to cause the speaker to produce an audible output of voice communications received in the voice communication session by the network module 314. In some implementations, the speaker 330 may be provided in the alarm panel 330. In other implementations, the speaker 330 may be positioned in a location separate from the alarm panel 310 such that the speaker 330 may have a coverage area that is different from the location of the alarm panel 310. In these implementations, the alarm system may include multiple speakers to provide a larger coverage area, such as an entire building the alarm system is monitoring or areas proximate to all of the sensors included in the alarm system.

The alarm panel 310 also may control a microphone. The microphone may include an acoustic to electronic transducer or sensor that converts sound into an electrical signal. The microphone may sense sound (e.g., from a person speaking proximate to the microphone) and produce an electrical signal based on the sound. For example, the microphone may sense sound produced in an area proximate to the microphone and send a signal representative of the sound to the controller 312. The controller 312 may determine a user input control based on the signal or provide the signal to the network module 314 to include as a voice communication in a voice communication session established by the network module 314 with another entity (e.g., a monitoring station). In some examples, the microphone may transmit the electrical signal directly to the network module 314 instead of transmitting the signal through the controller 312. In further implementations, the microphone may be positioned in a location separate from the alarm panel such that the microphone may have a coverage area that is different from the location of the alarm panel. In these implementations, the alarm system may include multiple microphones to provide a larger coverage area, such as an entire building the alarm system is monitoring or areas proximate to all of the sensors included in the alarm system.

The alarm system also includes an alternative display 332. The alternative display 332 may be any type of electronic display configured to render a visually perceivable display of information (e.g., an LCD display, a plasma display, a television, a computer monitor, a digital picture frame, a display integrated into an appliance, a display included in a portable device of a user, a mirror, a projection display device, etc.).

In some examples, the alarm system may be configured to control a display separate from the alarm panel 310 (e.g., a separate display provided as part of the security system or a television, a computer monitor, etc. that is not part of the security system, but a device with which the security system may communicate). Multiple mechanisms or devices to provide electronic content may be used by the security system and may be positioned throughout a building being monitored by the security system.

The alarm panel 310 communicates with the speaker 330 and the alternative display 332 over communication links 334 and 336. The communication links 334 and 336 may be similar to the communication links 324 and 326 described above.

The network operations center 340 is an electronic device (e.g., a server, host, etc.) configured to provide alarm monitoring services by exchanging electronic communications with the alarm panel 310 over the network 305. For example, the network operations center 340 may be configured to monitor alarm events generated by the alarm panel 310. In this example, the network operations center 340 may exchange electronic communications with the network module 314 included in the alarm panel 310 to receive information regarding alarm events detected by the alarm panel 310. The network operations center 340 may receive information regarding alarm events from the network module 314 in wireless data communications transmitted over a wireless data channel or may receive information regarding alarm events from the network module 314 in data communications transmitted over a wired connection. Panel and sensor information may be stored and processed in the network operations center 340. The information may be used to select personalized, relevant advertisements to provide to the customer's alarm system.

In some examples, the network operations center 340 may route the alarm data received from the network module 314 to a security monitoring system. For example, the network operations center 340 may transmit the alarm data to the security monitoring system over the network 305. The network operations center 340 may add information to the alarm data received from the network module 314 and may convert or transform the alarm data into a format used by the security monitoring system. The network operations center 340 may provide security monitoring services directly without the use of a separate security monitoring system.

The network operations center 340 also may facilitate establishment of a voice communication session between a remote user device (e.g., a device of a monitoring system operator, a device of the owner of the alarm system, a device of vendor providing an offer through the alarm panel 310, etc.) and the network module 314 included in the alarm panel 310. For example, the network operations center 340 may provide telephone information to the remote user or the network module 314 for use in establishing a voice communication session.

The advertisement management server 350 is an electronic device (e.g., a server, host, etc.) configured to provide advertising services by exchanging electronic communications with the network operations center 340. For instance, the advertisement management server 350 may receive, from the network operations center 340, criteria used to select an advertisement. The received criteria may include customer profile information derived from customer information provided by the customer and sensor information that is based on the customer's physical interactions monitored by the alarm system. The advertisement management server 350 may include a processor that compares the received criteria to attributes of available advertisements, selects an advertisement based on the comparison, and sends the selected advertisement to the network operations center 340 for delivery to the alarm panel 310. The advertisement management server 350 may include an electronic data store (e.g., a database) in which the advertisement management server 350 stores available advertising content and accesses selected advertisements to provide to the network operations center 340. Stored advertisements may include information related to the advertiser, a timeframe of the advertisement, and messaging information defining how the advertisement is to be delivered. The advertisement management server 350 may manage and provide the available advertisements based on this information (e.g., the advertisement management server 350 may delete advertisements when the time frame expires). The advertising management server 350 may offer a website by which advertisers may design campaigns.

The advertising content administrator 360 manages the content of the advertisement management server 350. For instance, the advertising content administrator 360 may add new advertisements to advertisement management server 350, and update current advertisements previously available in the advertisement management server 350. For a given advertisement, the advertising content administrator 360 may define the criteria used by the advertisement management server 350 in selecting the advertisement. For example, the advertising content administrator 360 may define criteria that targets the advertisement to specific types of customers. The defined criteria may be based on the types of customer information or attributes that can be determined using any combination of the sensor information gathered from the alarm panel 310, user input from the network operations center 340 website, any other source of customer information, and other attributes that inform the desirability of a particular advertisement.

The advertisers 370 provide advertising content to the advertising content administrator 360 for addition (or updates) to the available advertising content. The advertisers 370 provide details related to the advertisement and criteria that the advertisers 370 would like the advertisement management server 350 to use in selecting the advertising content. The content administrator 360 determines whether the advertising content should be added to the available advertising content and negotiates a fee arrangement with the advertisers 370.

The advertisers 370 may be associated with product manufacturers, retail establishments, or advertising agencies. To that end, a manufacturer, retailer, or advertisement agency may send a request to add advertising content or may send a batch file of advertisements/coupons. The content administrator 360 selects an appropriate manufacturer for which to add advertising content, and updates the advertisement management server 350 using the advertising content.

The operations described above as being performed by the advertising content administrator 360 and the advertisers 370 may be performed by electronic systems automatically, without human intervention. In some examples, the operations described above by the advertising content administrator 360 and the advertisers 370 may be performed by electronic systems in response to user input provided by individuals.

Figure 4:
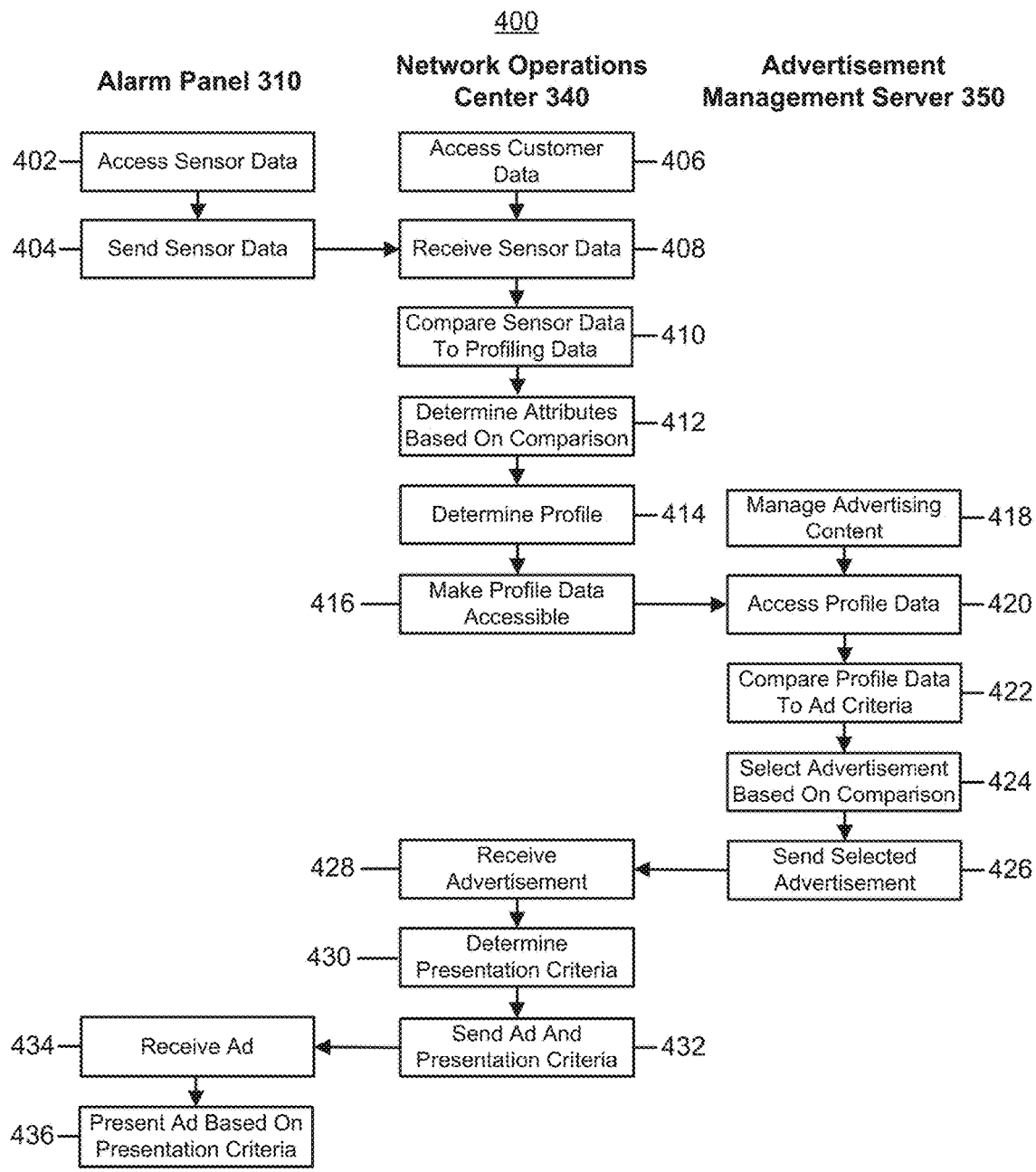
FIG. 4 is flow chart illustrating an example of a process for providing personalized advertisement content through a security system interface.

FIG. 4 illustrates an example of a process 400 for providing personalized advertisement content through a security system interface. For convenience, particular components described with respect to FIG. 3 are referenced as performing the process 400. However, similar methodologies may be applied in other implementations where different components are used to define the structure of the system, or where the functionality is distributed differently among the components.

The alarm panel 310 accesses sensor data (402). For example, the alarm panel 310 may receive a signal from the sensor 320 over the communication link 324. The signal may provide information associated with an alarm event, a security breach, a physical presence detection, a video signal, an environmental condition, a health monitoring event, a RFID tag identification, or an energy consumption condition. For instance, the sensor 320 may be a contact sensor attached to a door and the signal may be a signal that the contact has been broken (e.g., that the door has been opened). In other examples, the sensor 320 may be a smoke detector and the signal may indicate that smoke has been detected by the smoke detector or the sensor 320 may be a motion detector and the signal may indicate that motion has been detected by the motion detector.

The alarm panel 310 sends the accessed sensor data to the network operations center 340 over the network 305 (404). For example, the network module 314 may transmit the sensor data (or a processed version of the sensor data) to the network operations center 340 over the network 305. In some implementations, the network module 314 may send the sensor data in Internet Protocol (IP) packets over the network 305 or may send the sensor data in an SMS message over the network 305.

The sensor data includes information sufficient for the network operations center 340 to identify the customer associated with the sensor data and identify one or more events detected by the alarm panel 310. For instance, the sensor data may include information identifying the alarm panel 310, the user of the alarm panel 310, or the location associated with the alarm panel 310. The sensor data also may include a customer account number with which the network operations center 340 may access stored information associated with the customer's account. In addition, the sensor data may include information indicating the type of event detected and the specific sensor or detected condition that triggered the event (e.g., basement door sensor, third floor smoke detector, etc.).

The network operations center 340 accesses customer data (406). The network operations center 340 may access stored customer data from electronic storage associated with the network operations center 340. The network operations center 340 may receive customer data using techniques similar to those described above with respect to reference numeral 120.

The network operations center 340 receives the sensor data sent by the alarm panel 310 (408). For instance, the network operations center 340 receives the sensor data over the network 305 using a network interface. Upon receipt of the sensor data, the network operations center 340 processes the sensor data to determine information associated with the event or series of events detected by the alarm panel 310. In some implementations, the network operations center 340 extracts an account number from the sensor data and accesses, from electronic storage associated with the network operations center 340, information associated with the account number (e.g., the accessed customer data from reference numeral 406).

The network operations center 340 compares the sensor data to profiling data (410) and determines attributes of the customer based on the comparison (412). For instance, the network operations center 340 accesses profiling data that includes pre-determined profiles of sensor data associated with individuals with certain attributes and compares the sensor data to the profiling data to determine whether the sensor data matches one of the pre-determined profiles. When the sensor data matches (or closely matches) one of the pre-determined profiles, the network operations center 340 determines that the customer has attributes corresponding to typical attributes of individuals associated with the matched profile.

For instance, when the sensor data indicates that the customer has been away from the customer's home for several hours and arrives at around 6:00 pm, the network operations center 340 may determine that the sensor data matches a profile of individuals that are just home with no dinner because individuals that arrive at home with no dinner typically have similar sensor data. The just home with no dinner profile represents a short term attribute the network operations center 340 may determine for the customer.

When the sensor data indicates that weekday (i.e., Monday through Friday) sensor activity increases within two hours after 2:15 pm, the network operations center 340 may determine that the sensor data matches a profile of individuals that have school-age children because individuals that have school-age children typically have increases in sensor activity within two hours after 2:15 pm. The school-age children profile represents a long term attribute the network operations center 340 may determine for the customer.

The network operations center 340 determines a customer profile based on the attributes of the customer determined based on the sensor data and the accessed customer data (414) and makes customer profile data accessible to the advertisement management server 350 (416). For example, the network operations center 340 may determine a customer profile that includes attributes of customer included in the accessed customer data (e.g., name, age, gender, address, employer, etc.) and also includes the attributes of the customer determined based on the received sensor data (e.g., just home with no dinner, school-age children, etc.). The network operations center 340 may make the customer profile data accessible to the advertisement management server 350 by sending the customer profile data to the advertisement management server 350 in electronic communications or storing the customer profile data in electronic storage accessible by the advertisement management server 350.

The advertisement management server 350 manages advertising content (418). For instance, the advertisement management server 350 manages a database of available advertising content. The advertisement management server 350 may add new advertising content, update outdated advertising content, and remove expired advertising content. The advertisement management server 350 also may define criteria that is used to select each of the advertisements included in the database of available advertising content.

The advertisement management server 350 accesses the customer profile data made accessible by the network operations center 340 (420). The advertisement management server 350 may access the customer profile data made accessible by the network operations center 340 by receiving the customer profile data in electronic communications sent by the network operations center 340 or accessing the customer profile data from electronic storage accessible by the advertisement management server 350 in which the network operations center 340 stored the customer profile data.

The advertisement management server 350 compares the accessed customer profile data to advertisement criteria (422) and, based on the comparison of the accessed customer profile data to the advertisement criteria, the advertisement management server 350 selects an advertisement to deliver to the customer (424). After accessing the customer profile data, the advertisement management server 350 compares the accessed customer profile data to advertisement criteria to select an available advertisement that may be of interest to the customer. For instance, the advertisement management server 350 may select an advertisement for a Chinese restaurant with delivery service to an area that includes customer's house when the customer profile data indicates that the customer is just home with no dinner. In another example, the advertisement management server 350 may select an advertisement for school supplies when the customer profile data indicates that the customer has school-age children and the start of a new school year is approaching.

The advertisement management server 350 sends the selected advertisement to the network operations center 340 over the network 305 (426). For example, the advertisement management server 350 may transmit the selected advertisement to the network operations center 340 using wired or wireless data communications.

The network operations center 340 receives the selected advertisement sent by the advertisement management server 350 (428) and determines presentation criteria related to the selected advertisement (430). The network operations center 340 may, based on the selected advertisement, determine a type of device or communication medium with which to present the selected advertisement and determine other presentation options.

For example, when the selected advertisement is directed to a short term need of the customer, the network operations center 340 may determine to present the selected advertisement using an electronic display in an area in which the user is detected by the alarm panel 310 and also provide an audible alert to indicate to the customer that the advertisement is being presented. In this example, the network operations center 340 may determine that the advertisement for the Chinese restaurant with delivery service to an area that includes customer's house fulfills a short term need of the customer. Based on the determination that the advertisement for the Chinese restaurant fulfills a short term need, the network operations center 340 may determine to present the advertisement for the Chinese restaurant on the electronic display 316 of the alarm panel 310 when the customer is detected to be near the alarm panel 310 and also activate the speaker 330 to produce an audible alert to direct the user's attention to the advertisement for the Chinese restaurant.

In another example, when the selected advertisement is directed to a long term need of the customer, the network operations center 340 may determine to present the selected advertisement using a mechanism that is less intrusive and with which the customer may review the selected advertisement at the user's convenience. In this example, the network operations center 340 may determine that the advertisement for the school supplies fulfills a long term need of the customer. Based on the determination that the advertisement for the school supplies fulfills a long term need, the network operations center 340 may determine to present the advertisement for the school supplies on the alternative display 332 (e.g., as an email communication to the customer's computer) and determine not to produce an audible alert to direct the user's attention to the advertisement for the school supplies.

The network operations center 340 sends the selected advertisement and the determined presentation criteria to the alarm panel 310 over the network 305 (432) and the alarm panel 310 receives the selected advertisement and the determined presentation criteria sent by the network operations center 340 (434). For example, the network operations center 340 may send the selected advertisement and the determined presentation criteria over the network 305 and the network module 314 may receive the selected advertisement and the determined presentation criteria from the network 305.

The alarm panel 310 presents the advertisement based on the presentation criteria (436). The alarm panel 310 may, upon receipt, immediately present the advertisement on the output device defined by the presentation criteria and with characteristics (e.g., a audible alert) defined by the presentation criteria. In some implementations, the alarm panel 310 may, upon receipt, store the advertisement in electronic storage and wait for additional events defined by the presentation criteria. In these implementations, the presentation criteria may define that the advertisement is to be presented in response to a specific door being opened during a specific time frame. In this regard, the alarm panel 310 may monitor sensor data and, if the alarm panel 310 determines that the specific door is opened during the specific time frame based on the sensor data, the alarm panel 310 triggers presentation of the advertisement.

Figure 5A:
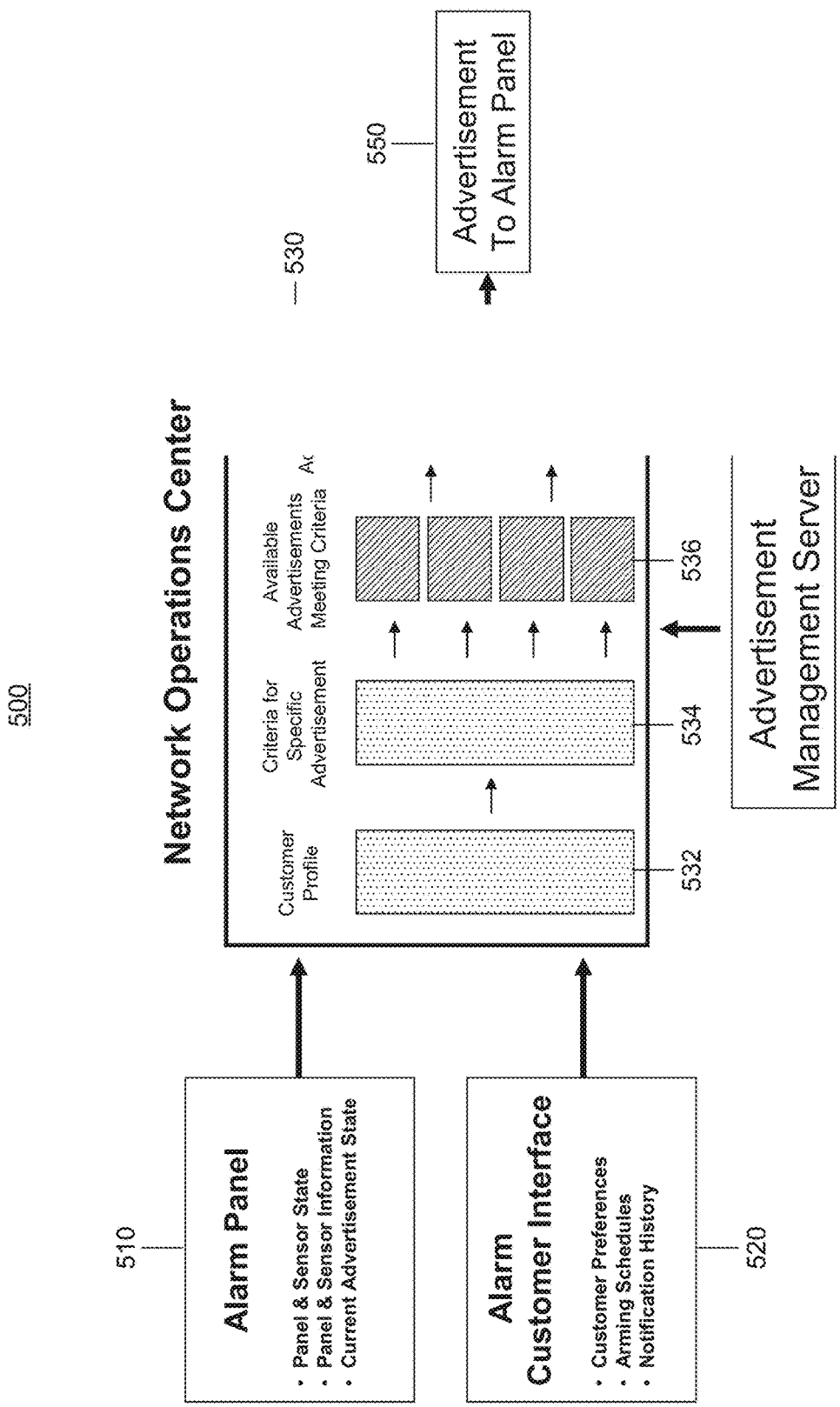
FIG. 5A is a diagram of an example electronic system configured to select personalized content based on customer profiles and content criteria.

FIG. 5A illustrates an electronic system 500 configured to select personalized content based on customer profiles and content criteria. The electronic system 500 includes a network operations center 530 and an advertisement management server 540. The network operations center 530 may be similar to the network operations center 340 described above with respect to FIG. 3 and the advertisement management server 540 may be similar to the advertisement management server 350 described above with respect to FIG. 3.

As shown in FIG. 5A, the network operations center 530 receives inputs from the alarm panel 510 and the alarm service provider customer interface 520. The alarm panel 510 information may include panel, sensor, and advertisement status information. The panel state information indicates whether the system is armed or disarmed, and the sensor state information may be open, closed in the case of door sensors, but may also indicate temperature, or the presence of water. The sensor state information may include information related to any of the sensed attributes described throughout this disclosure.

The current advertisement status information may indicate whether a message is currently being displayed on an electronic display of the alarm panel 510 and indicate how long the current message has been displayed. The network operations center 530 may use the current advertisement status information to determine whether to present a particular advertisement or change the currently presented advertisement. For instance, when the currently displayed advertisement has only been displayed for a few seconds, the network operations center 530 may determine not to change the advertisement, even though the sensor state information indicates that a new event has been detected that would normally result in presentation of an advertisement.

The alarm service provider customer interface 520 may provide information such as online usage information, customer location information, and alarm and non-alarm notification history information. A customer also may enter preferences through the alarm service provider customer interface 520 indicating interest in certain advertisements. The information provided through the alarm service provider customer interface 520 supplements panel and sensor data for use by the network operations center 530 in delivering customized advertisements.

The network operations center 530 may use the inputs received from the alarm panel 510 and the alarm service provider customer interface 520 to build a customer profile 532. The customer profile 532 then may be matched against a set of criteria 534 established by the advertisement management server 540. Based on this analysis, the network operations center 530 (or the advertisement management server 540) may identify a subset of advertisements 536 meeting criteria included in the customer profile 532. Of the available advertisements 536, the network operations center 530 (or the advertisement management server 540) may select some or all of the advertisements 538 based on established parameters such as cost of advertisements, customer advertisement history, etc. The available advertisements criteria may be further vetted until only one advertisement is chosen.

The network operations center 530 (or the advertisement management server 540) delivers a selected advertisement to the alarm panel 510 over a secure wireless or broadband network using a network interface module 550. Once at the alarm panel 510, the selected advertisement may be shown on an electronic display included in the alarm panel 510. The advertisement also may be delivered as a voice recording over a speaker system included in the alarm system.

FIG. 5B shows a customer profile 532 generated based on information received from a customer and sensor data received from a monitoring system. The customer profile 532 includes multiple attributes 561 to 569 that may be determined based on information received from the alarm panel 510 and information received from the alarm service provider customer interface 520. For instance, the customer profile 532 includes a name attribute 561, an address attribute 562, a gender attribute 563, an at home attribute 564, a working empty nester attribute 565, a children attribute 566, a just home with no dinner attribute 567, a currently relaxed attribute 568, and a large home attribute 569. The name attribute 561, the address attribute 562, and the gender attribute 563 are attributes that are determined using information received from the alarm service provider customer interface 520. The at home attribute 564, the just home with no dinner attribute 567, and the currently relaxed attribute 568 are attributes that are determined using information received from the alarm panel 510. The working empty nester attribute 565, the children attribute 566, and the large home attribute 569 may determined using information received from the alarm panel 510 and/or information received from the alarm service provider customer interface 520.

FIG. 5C shows advertisement criteria 534 used to match advertisements to customers based on customer profiles. The advertisement criteria 534 includes multiple attributes 571 to 579 that may be used to select customers for delivery of the advertisement associated with the advertisement criteria 534. For instance, the advertisement criteria 534 includes a brand/product attribute 571, a geographic region attribute 572, a targeted gender attribute 573, an at home attribute 574, a working empty nester attribute 575, a children attribute 576, a just home with no dinner attribute 577, a currently relaxed attribute 578, and a large home attribute 579.

As shown, the attributes included in the advertisement criteria 534 may include a variety of values that may be used to select customers to receive the advertisement. The brand/product attribute 571 identifies the type of advertisement and may be compared to customer preferences to determine whether a customer prefers or does not prefer the type of advertisement associated with the advertisement criteria 534. Because the example customer profile 532 shown in FIG. 5B does not include customer preference information, the brand/product attribute 571 does not inform the decision of whether to select the advertisement for the customer associated with the customer profile 532.

The geographic region attribute 572 identifies the geographic region to which the advertisement is applicable. In the example shown in FIG. 5C, the geographic region attribute 572 indicates that the advertisement is applicable to the entire United States (e.g., the advertisement is provided by a national pizza delivery chain). Because the address attribute 562 included in the example customer profile 532 shown in FIG. 5B corresponds to a geographic location within the geographic region defined by the geographic region attribute 572, the advertisement remains a possible selection for the customer associated with the customer profile 532.

The targeted gender attribute 573 specifies a gender to which the advertisement is applicable. In the example shown in FIG. 5C, the targeted gender attribute 573 indicates that neither gender is preferred or that the advertisement is applicable to any gender and does not inform the decision of whether to select the advertisement. In other examples, advertisements may be for gender-specific products (e.g., female hygiene products) or targeted to specific genders and the gender attribute 563 may inform the decision of whether to select the advertisement.

The at home attribute 574 and the just home with no dinner attribute 577 are defined as required attributes in the advertisement criteria 534. Accordingly, the advertisement associated with the advertisement criteria 534 is only provided to a customer with a profile that indicates sensor data received from the customer's alarm panel matches a profile of a customer that is at home and just home with no dinner. Because the at home attribute 564 and the just home with no dinner attribute 567 included in the example customer profile 532 shown in FIG. 5B indicate that the customer is at home and just home with no dinner, the advertisement remains a possible selection for the customer associated with the customer profile 532.

The working empty nester attribute 575 and the currently relaxed attribute 578 are defined as undesired attributes in the advertisement criteria 534. Accordingly, the advertisement associated with the advertisement criteria 534 is only provided to a customer with a profile that indicates the customer is not a working empty nester and not currently relaxed. Because the working empty nester attribute 565 and the currently relaxed attribute 568 included in the example customer profile 532 shown in FIG. 5B indicate that the customer is not a working empty nester and is not currently relaxed, the advertisement remains a possible selection for the customer associated with the customer profile 532.

The children attribute 576 is defined as a desired attribute in the advertisement criteria 534. Accordingly, although the advertisement associated with the advertisement criteria 534 may be provided to a customer that does not have children, the advertisement associated with the advertisement criteria 534 is more likely to be provided to a customer with a profile that indicates the customer has children. Because the children attribute 566 included in the example customer profile 532 shown in FIG. 5B indicates that the customer has school-age children, the advertisement is more likely to be provided to the customer associated with the customer profile 532 than to customers without children.

The large home attribute 579 specifies whether the customer has a large home. In the example shown in FIG. 5C, the large home attribute 579 indicates that this attribute is irrelevant to the decision of whether to select the advertisement and is not considered.

As shown in FIGS. 5B and 5C, the attributes included in the example customer profile 532 shown in FIG. 5B match all of the required and desired attributes included the example advertisement criteria 534 shown in FIG. 5C. In addition, the attributes included in the example customer profile 532 shown in FIG. 5B do not match any of the undesired attributes included the example advertisement criteria 534 shown in FIG. 5C. Accordingly, when the network operations center 530 determines that a customer has the customer profile 532 shown in FIG. 5B, the network operations center 530 selects the advertisement associated with the advertisement criteria 534 shown in FIG. 5C.

Figure 6:
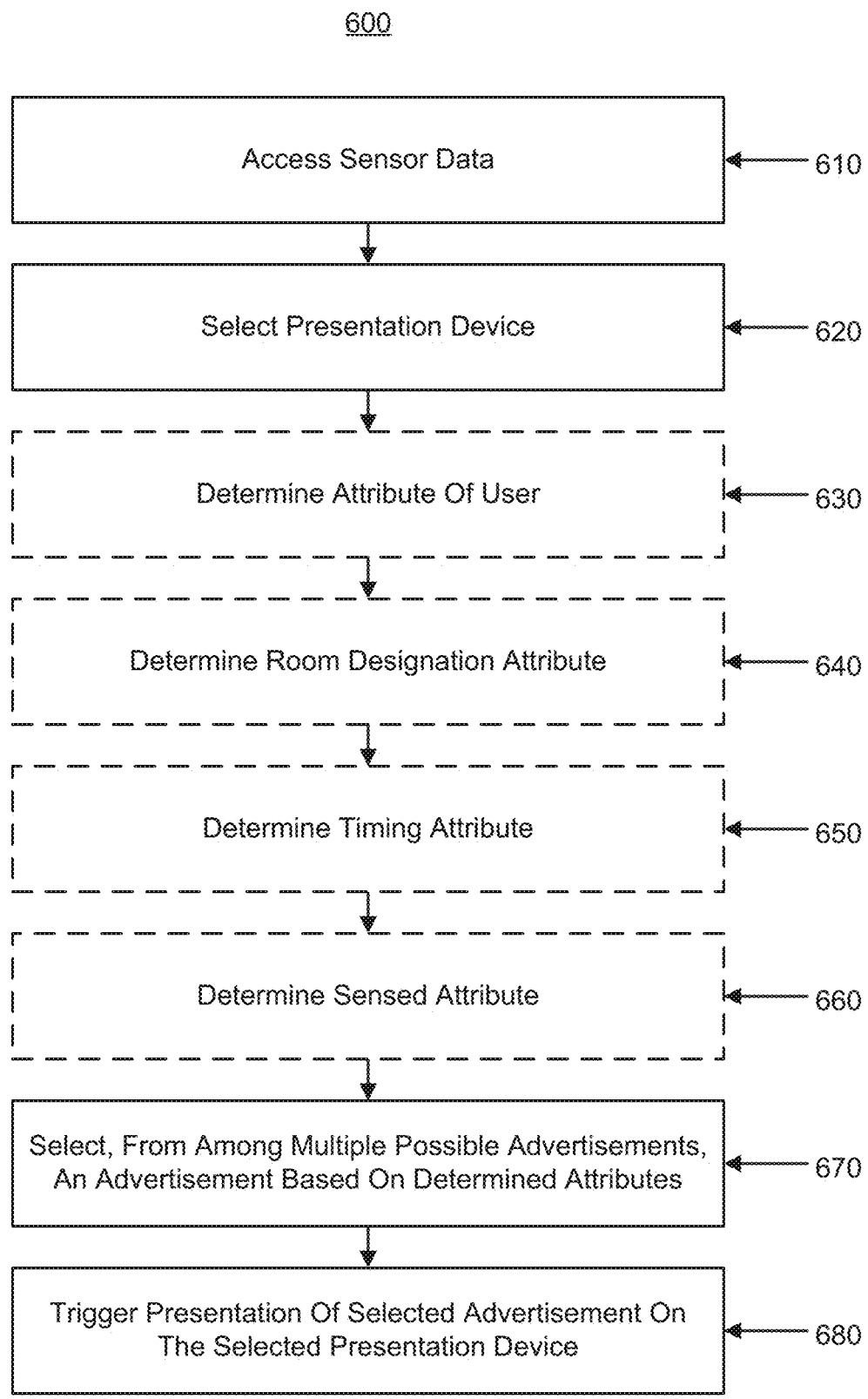
FIG. 6 is a flow chart illustrating an example of a process for selecting personalized content and triggering distribution of the personalized content based on sensor data.

FIG. 6 illustrates a process 600 for selecting personalized content and triggering distribution of the personalized content based on sensor data. The operations in flow chart 600 are described generally as being performed by a processor. In some implementations, the processor may be included in an electronic device or system configured to send and receive communications over a network. For instance, the processor may be included in a monitoring system, a monitoring application server, or another type of electronic device included in a system configured to monitor sensor data and select electronic content based on the monitored sensor data. The operations of process 600 may be performed by multiple processors included in one or more electronic devices or systems.

The processor accesses sensor data (610). For example, the processor may receive sensor data captured by sensors configured to sense physical attributes of a surrounding environment. The processor may access sensor data using techniques similar to those described above with respect to reference numeral 110 and reference numeral 402.

The processor selects a presentation device (620). For example, the processor may access a list of possible display interfaces (or communication media) that a user has registered. In this example, the processor may access an "address book" in which the user provides all of the places that they would like to receive content or alert notifications and provides preferences for particular types of content or particular time periods. The content destinations may include, for example, a monitoring system LCD display, a PDA, a Web-based interface (e.g., the content or alert may be displayed on a web page which the customer may access), an SMS or text message, an email, and a television display. The processor may select, from among the list of possible display interfaces, a particular display interface based on the preferences of the user.

In some implementations, the processor may use the accessed sensor data to select the presentation device. For instance, a monitoring system may include multiple presentation devices with which advertisements may be presented. The processor may compare locations of the multiple presentation devices to a location of an event indicated as being detected in the sensor data. Based on the comparison, the processor may select the presentation device included in the monitoring system that is closest to the detected event (e.g., the processor may select an LCD display in a kitchen when a motion sensor detects that a user is in the kitchen or the processor may select a speaker in a bedroom when a contact sensor included on a door to the bedroom detects that the door has been opened).

In other implementations, the processor may use the accessed sensor data to determine whether the user is at home. When the processor determines that the user is not at home based on the sensor data, the processor may select a portable device (e.g., a smart phone) as the presentation device for the content. For instance, when the sensor data indicates that the user is not at home and that a water sensor has detected a water leak within the house, the processor may send the user an SMS or text message indicating that a water leak has been detected along with an advertisement for a plumber that may be able to handle the water leak.

The selected presentation device may be used in selecting advertisement content for the customer. For instance, some advertisements only may be available for particular types of presentation devices (e.g., visual advertisements cannot be selected when the presentation device is a speaker and audible advertisements cannot be selected when the presentation device is an LCD display without a speaker).

The processor determines one or more attributes based on the accessed sensor data. For instance, the processor may determine an attribute of a user of a monitoring system based on the sensor data (630). The processor may determine short term attributes of a user based on sensor data. Short term attributes may be attributes that identify current physical behavior associated with the user that may change in a relatively short amount of time. For example, the short term attributes may indicate that a user recently entered a home based on a user deactivating an alarm system or may indicate the user's physical presence in a particular room within the home based on motion sensor data. The short term attributes also may indicate that the user has opened a medicine cabinet based on a contact sensor configured to monitor a door of the medicine cabinet or may indicate that a user is currently using an appliance based on an energy consumption sensor monitoring the appliance. The short term user attributes may be leveraged to identify content that may be relevant to the user's current interests or content that is useful to the user's current situation. The short term user attributes further may be leveraged to trigger presentation of content in a manner that is most likely to garner the user's attention.

In addition, the processor may determine long term attributes of a user based on sensor data. The long term attributes may be attributes that identify physical attributes associated with the user that are unlikely to change for a relatively long amount of time. The processor may determine the long term attributes by monitoring sensor data over relatively long periods of time (e.g., days, weeks, months, years, etc.) and determining a profile that matches the user's monitored behaviors. For example, the processor may determine that the user has left the home for a relatively short period of time (e.g., 1 minute) every Sunday morning for the last three months. In this example, the processor may determine that the user receives a Sunday morning newspaper and is retrieving the newspaper during the relatively short period of time the user leaves the home on Sunday mornings. In another example, the processor may determine presence of children in the user's home every other week based on the sensor data (e.g., increased sensor data every other week indicating that more people are present in the home, sensed behaviors match those of children only every other week, etc.). In this example, the processor may determine that the user is divorced and shares custody of the user's children with the user's former spouse.

The processor also may determine a room designation attribute based on the sensor data (640). The processor may determine an aspect of room based on sensor data reflecting how the room is being used. For example, the processor may determine that a particular room is a bath room when users typically stay in the room for relatively short periods of time as compared to other rooms and/or when the room includes a medicine cabinet sensor because medicine cabinets are often included in bath rooms. In another example, the processor may determine that a particular room is a bedroom of a small child when sensor data indicates that a person typically enters the room at 8:00 pm, the light in the room is turned off shortly after the person enters the room, little activity in the room occurs in the room until the morning, and the light is not turned on until the morning. In this example, the processor determines that the sensed behavior indicates the person is going to bed at 8:00 pm, which is a typical bed time for a small child. Accordingly, the processor designates the room as a bedroom of a small child.

The processor may determine a timing attribute (650). For instance, the processor may determine a current time of day, a current day of the week, a current month of a year, a current season, and/or a current year. The processor also may determine timing information related to detected events. For example, the processor may track a time period in which an alarm system has been armed and may track how long ago a particular event occurred. The timing attributes may be used to inform content selection.

Further, the processor may determine a sensed attribute based on sensor data (660). The sensed attribute may be an attribute directly measured or sensed by a sensor. For example, the sensed attribute may be an environmental attribute (e.g., air quality, temperature, water, rain, light, wind, etc.), a health monitoring attribute (e.g., blood sugar, blood pressure, bed mat sensor, prescription drug usage, etc.), an energy consumption attribute (e.g., energy used by an appliance or device in a home), an identification attribute (e.g., an RFID identification of a tagged article, a product or brand identified based on video data, a user identified based on video data, etc.), or any other attribute that may be measured or sensed by a sensor.

The processor may derive attributes based on multiple sensed attributes. For instance, the processor may determine that a home has poor insulation when, in the winter, energy consumption of the user's heating system is relatively high as compared to other monitored households and temperature within the user's house remains relatively low as compared to other monitored households.

In some implementations, the processor may use any combination of determined customer attributes (630), determined room designation attributes (640), determined timing attributes (650), and determined sensed attributes (660) to determine profile information that reflects characteristics of a user or property monitored by a monitoring system. In these implementations, the processor may monitor sensor data over time and compare combinations of determined attributes to rich profiles that correspond to users or properties with specific characteristics. When the processor detects a match between a combination of determined attributes and one or more profiles, the processor may determine that the user or property monitored by the monitoring system exhibits the specific characteristics that correspond to the matched profiles.

Profiles may last for a relatively long period of time or be fleeting. The duration of a profile may be a function of the type of profile. Profiles also may be associated with a profile strength measure, which is an indication of a level of confidence that the processor has in the profile being accurate. For some profiles, the processor only may be able to determine that a profile exists in a property to a slight likelihood, while for other profiles, a certain sensor activity may suggest a strong likelihood of a profile being present. Additionally, third party profiles and database information may be incorporated to enhance the accuracy of sensor and video activity based profiles. Table 1, below, provides examples of profiles that a processor may detect for a user or a property monitored by a monitoring system. Table 1 provides information that defines the profile, the duration of the profile, the profile strength, and the profile indication, which refers to the sensor data that leads to detection of the profile.

interest to users with the determined attributes. The processor may consider any combination of the determined attributes (or profile information determined based on the attributes) and select an advertisement determined to be most relevant to the customer based on the determined attributes.

In one example, when the processor detects that the user is currently using an oven, the processor may select an advertisement for a cooking-related or oven-related product (e.g., a discount grocery coupon, an oven cleaning service, a cookware advertisement, etc.) and immediately present the selected advertisement. As another example, when the pro-

TABLE 1

| Profile | Profile Duration | Profile Strength | Profile Indication |
|---|---|---|---|
| At Home | Short | Strong | Internal motion sensors indicate current presence in the home. |
| No Vacation in Six Months | Short | Strong | Sensors indicate that home has been consistently occupied each day with similar activity patterns for each day in a six month period. |
| Spouse Traveling | Short | Medium | Sensors used in security system are not typically armed and then suddenly are armed two days consecutively. |
| Just Home, no Dinner | Short | Strong | No activity in home from hours 11am to 5pm, and then activity occurs indicating home now occupied. |
| Occupants Currently Relaxed | Short | Medium | Sensor activity pattern indicates occupants are At Home (see indications for At Home) but not moving very often, and time is earlier than typical sleeping hours. Indicates occupants likely watching TV or reading. |
| Frugal | Long | Medium | During summer, AC is set to temperatures in highest 10% of all users while in winter, thermostat is set to temperatures in bottom 10% of all users. |
| Hot Outside | Short | Strong | External thermocouple sensor indicates that it is much hotter than average for this period of calendar outside. |
| Bed Mat Sensor Triggered | Short | Strong | Bed mat sensor positioned on bed detects presence of liquid (e.g., bodily fluids) on sensor. |
| Small Children | Long | Sensor - Medium Image - Strong | Weekday door and internal motion activity is much higher than typical for a prolonged period, even during school hours. Multiple rooms have simultaneous motion activity. Image analysis detects small inhabitants. |
| Large Home | Long | Sensor - Medium | Home has multiple sensors defined as external door sensors, has multiple motion, window, smoke or other sensors. Average time between external door sensor event and internal motion sensor event is longer than typical. |
| School Aged Children | Long | Strong | Weekday increased sensor activity within two hours after 2:15pm. |
| High Value Home | Long | Strong | Home is in zip code with higher average values and is a Large Home (see Large Home indication). |
| Heavy Energy Consumer | Long | Strong | Sensors detect much higher use of energy than the average home. |
| Working Empty Nester | Long | Medium/Strong | Very little weekday sensor activity, with many days showing no weekday activity during business hours. |

The processor selects, from among multiple possible advertisements, an advertisement based on the one or more determined attributes (670). For instance, the processor compares the determined attributes with advertisement criteria and identifies advertisements that are likely to be of interest to users with the determined attributes.

cessor determines that the user receives a Sunday morning newspaper, the processor may select an advertisement for a competing or complementing product and present the advertisement on a Sunday morning (e.g., an advertisement for a Sunday morning news television program, an advertisement for a news-related website, an advertisement for a new type of coffee the user may enjoy while reading a newspaper, etc.). In a further example, when the processor determines that a user is divorced and shares custody of the user's children every other week, the processor may select a first advertisement during a week in which the user does not have custody of the user's children (e.g., an advertisement for a Thai food restaurant) and a second advertisement during a week in which the user has custody of the user's children (e.g., an advertisement for a pizzeria with games designed for children). As yet another example, when the processor determines that a home has poor insulation, the processor may select an advertisement for energy saving windows.

Table 2, below, provides even more examples of advertisement criteria that a processor may consider when selecting an advertisement for a user. Table 2 provides information that describes the content, the required profiles for selecting the content, the desired profiles for selecting the content, the delivery medium, and the delivery times.

The required profiles refer to customer profiles or attributes that the customer must have in order for the processor to select the corresponding content. If the customer does not have any one of the required profiles, the processor removes the corresponding content from consideration. The desired profiles refer to customer profiles or attributes that the customer is preferred to have in selecting the corresponding content. The desired profiles may be considered when attributes of the customer match the required profiles for multiple pieces of content (e.g., advertisements). In this regard, the processor may select, from among the multiple pieces of content, the content with which the customer has attributes matching the most desired profiles (e.g., the processor may select a first advertisement over a second advertisement when attributes of the customer match one desired profile of the first advertisement, but do not match any of the desired profiles for the second advertisement).

The delivery medium refers to where the processor presents the selected content. The delivery medium field may define a priority list of possible mediums (e.g., the selected content is presented using the first medium in the list the customer has registered for content delivery, the selected content is presented to the user successively in an order of the mediums in the list until confirmation is received from the user that the content has been perceived, etc.). The delivery medium field also may define multiple mediums and the selected content may be presented concurrently using each of the multiple mediums. The delivery medium field may be used in selecting the presentation device described above with respect to reference numeral 620.

The delivery time field refers to the time in which the processor presents selected content to the user. The delivery time may be immediate or may relate to an event monitored by the alarm system. For instance, the processor may present selected content in response to triggering of a sensor included in the alarm system or upon determination of a particular attribute of the customer based on the sensor data.

TABLE 2

| Content Description | Required Profile/s | Desired Profile/s | Delivery Medium/s | Delivery Time |
|---|---|---|---|---|
| Instant coupon for delivery of Thai Food | 1) Just home, no dinner 2) At Home | 1) Working empty-nesters | 1) In-home display 2) TV 3) SMS | Immediate upon detection of Just Home, no dinner profile |
| Instant coupon for delivery of Pizza | 1) Just home, no dinner 2) At Home | 1) Small Children 2) School Age Children | 1) In-home display 2) TV | Immediate upon detection of Just Home, no dinner profile |
| Sale this weekend on low energy light-bulbs | 1) Frugal | 2) Large Home 3) Hot Outside | 1) In-home display 2) Email 3) Web | Thursday, after 5:30pm, and when profiles Occupant Relaxed and At Home exist. |
| Last-minute special on flights from DCA to Bahamas | 1) No Vacation in Six Months | | 1) In-home display | Next point when At Home and Occupants Relaxed both active profiles if before 8:30pm. |
| Lawn service available | 1) Hot Outside | 1) Large Home 2) Small Children | 1) in-home display 2) email | Immediate |
| Linen Service Coupon | 1) Bed Mat Sensor Triggered | | 1) in-home display 2) email | Immediate or Morning after time when sensor triggered |

The processor also may consider profile strength in selecting advertisements. For example, when attributes of the customer match the profiles for multiple pieces of content (e.g., advertisements), the strength of the profile determination by the processor may be considered in selecting between the multiple pieces of content. In this example, the processor may select a first advertisement over a second advertisement when attributes of the customer that match the first advertisement criteria have a strong profile strength and attributes of the customer that match the second advertisement criteria have a medium profile strength.

The processor triggers presentation of the selected advertisement on the selected presentation device (680). For instance, the processor triggers presentation of the selected advertisement on the selected presentation device based on the delivery time corresponding to the selected advertisement. The processor may trigger presentation of the selected advertisement immediately upon selection or may store the selected presentation and trigger presentation of the selected advertisement at a particular time and/or upon detection of a particular event detected by the alarm system.

Figure 7:
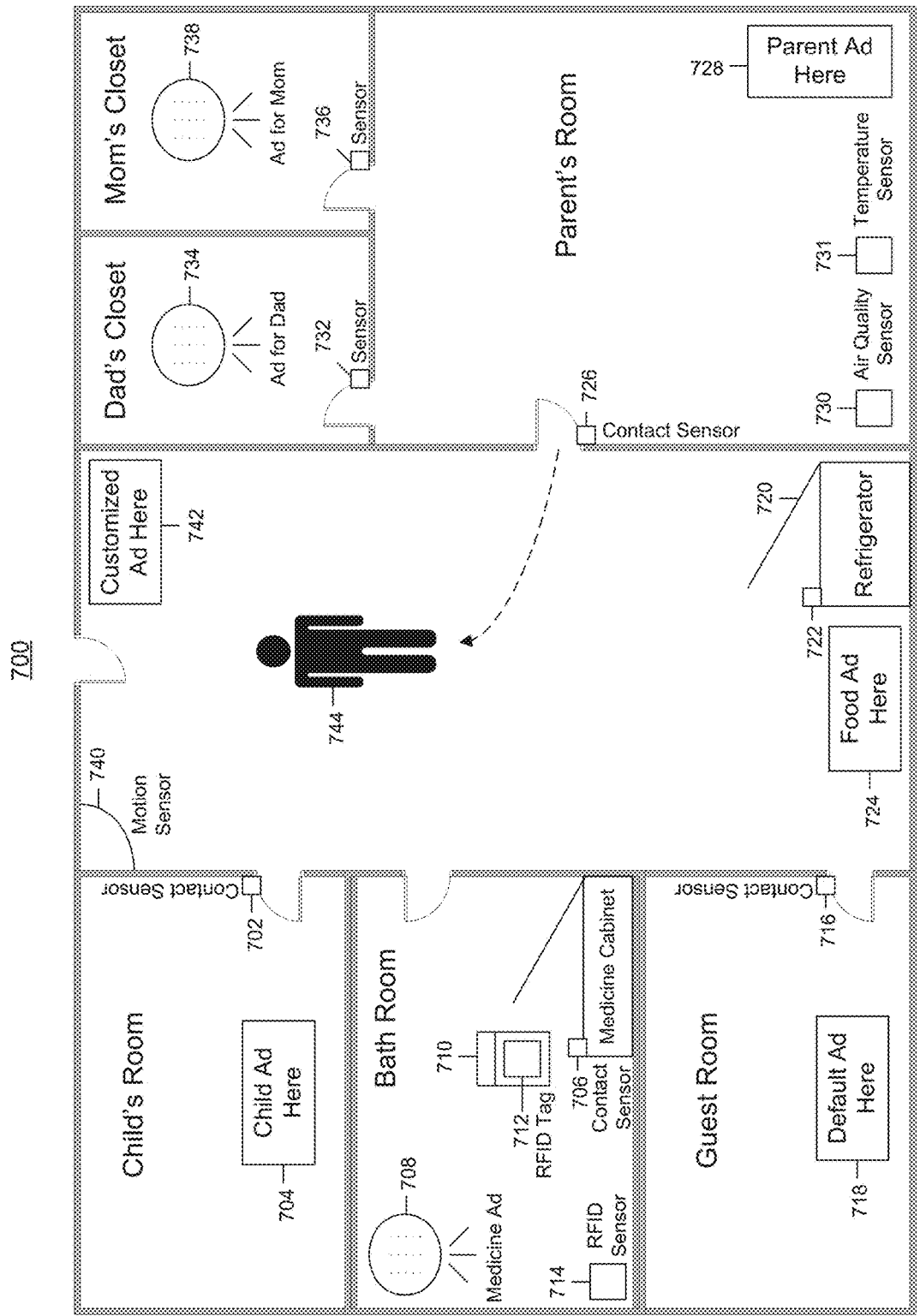
FIG. 7 is a diagram illustrating examples of personalized content presentation using sensor data.

Referring to FIG. 7, a diagram 700 illustrates examples of personalized content presentation using sensor data. The diagram 700 represents a floor plan of a user's home and illustrates various examples of how monitoring system data (and monitoring system output devices) may be leveraged in driving personalized content delivery.

The diagram 700 includes a contact sensor 702 located on a door to a child's bedroom. The room may have been designated as a child's bedroom based on sensor data using techniques similar to those described above with respect to reference numeral 640 in FIG. 6. When the contact sensor 702 detects opening of the door to the child's bedroom, the monitoring system may control a display device 704 included in the child's bedroom to display an advertisement directed to a child. The display of the advertisement directed to the child may be triggered in response to opening of the door to draw attention to the advertisement and increase the likelihood that the advertisement is perceived by the child. The display device 704 may be a television included in the child's bedroom that the monitoring system is capable of controlling.

The diagram 700 also includes a contact sensor 706 located on a door to a medicine cabinet included in a bath room. When the contact sensor 706 detects opening of the door to the medicine cabinet, the monitoring system may control a speaker 708 included in the bath room to output an advertisement related to medicine (e.g., a sale being offered by a pharmacy). The bath room further may include an RFID sensor 714 that is configured to detect a bottle 710 when the bottle 710 is removed from the medicine cabinet and includes an RFID tag 712.

The monitoring system may select the advertisement based on the detection of the bottle. For instance, when the bottle 710 includes brand name prescription medication, the monitoring system may select an advertisement for generic medication that achieves the same effect of the brand name prescription medication and that is available for a lower cost. When the bottle 710 includes a particular type of herbal supplement, the monitoring system may select an advertisement for a retail establishment that sells herbal supplements or select an advertisement for another type of herbal supplement that is frequently used in combination with the particular type of herbal supplement included in the bottle 710. The monitoring system also may infer an attribute of the user based on the bottle 710 and select an advertisement based on the inferred attribute. For example, when the bottle 710 includes prescription medication often or only taken by a particular type of person, the monitoring system may select an advertisement directed to the particular type of person (e.g., when the medicine is often taken by elderly citizens, the monitoring system may select an advertisement that refers to senior discounts offered by a local movie theater).

The diagram 700 includes a contact sensor 716 located on a door to a guest room. The room may have been designated as a guest room based on sensor data indicating that the room is used infrequently. When the contact sensor 716 detects opening of the door to the guest room, the monitoring system may control a display device 718 included in the guest room to display a default or generic advertisement because the monitoring system is unable to infer attributes of the user entering the guest room with a high degree of confidence. The display of the default or generic advertisement may be triggered in response to opening of the door to draw attention to the advertisement and increase the likelihood that the advertisement is perceived by the person entering the guest room. The display device 718 may be a television included in the guest room that the monitoring system is capable of controlling.

The diagram 700 includes a sensor 722 located on a refrigerator included in the user's home. The sensor 722 may be configured to detect opening of the refrigerator door 720 or another attribute related to the refrigerator (e.g., energy consumption, freshness of food in refrigerator, types of food in the refrigerator, etc.). When the sensor 722 detects opening or closing of the refrigerator door 720, the monitoring system may control a display device 724 located near the refrigerator to display an advertisement related to food or drink because the user is likely interested in food or drink when accessing the refrigerator. When the sensor 722 detects another attribute related to the refrigerator, the monitoring system may select an advertisement based on the detected attribute. For instance, when the sensor 722 detects that energy consumption of the refrigerator is relatively high, the monitoring system may present an advertisement for a new energy-efficient refrigerator. The display device 724 may be an LCD display included in another appliance (or the refrigerator itself) that the monitoring system is capable of controlling.

The diagram 700 further includes a contact sensor 726 located on a door to a parent's bedroom. The room may have been designated as a parent's bedroom based on sensor data using techniques similar to those described above with respect to reference numeral 640 in FIG. 6. When the contact sensor 726 detects opening of the door to the parent's bedroom, the monitoring system may control a display device 728 included in the parent's bedroom to display an advertisement directed to a parent. The display of the advertisement directed to the parent may be triggered in response to opening of the door to draw attention to the advertisement and increase the likelihood that the advertisement is perceived by the parent. The display device 728 may be a television included in the parent's bedroom that the monitoring system is capable of controlling.

The diagram 700 includes an air quality sensor 730 and a temperature sensor 731, which may be used by the monitoring system to select the advertisement to display to the parent. For example, when the air quality sensor 730 detects that the air quality in the home is poor, the monitoring system may present a message indicating that the air quality in the home is poor and present an advertisement for an environmental filter that is designed to improve air quality. In another example, when the temperature sensor 731 detects that the temperature in the home is relatively warm, the monitoring system may present an advertisement for a fan (e.g., a ceiling fan) that may be used to provide additional cooling for the parent's bedroom.

The diagram 700 also includes a contact sensor 732 located on a door to a dad's closet and a contact sensor 736 located on a door to a mom's closet. The closets may have been assigned to the dad and mom, respectively, during installation of the monitoring system or may have been assigned automatically based on sensor data reflecting the frequency of door openings and times with which the doors have been opened (e.g., using techniques similar to those described above with respect to reference numeral 640 in FIG. 6). When the contact sensor 732 detects opening of the door to the dad's closet, the monitoring system may control a speaker 734 included in the dad's closet to output an advertisement directed to the dad. When the contact sensor 736 detects opening of the door to the mom's closet, the monitoring system may control a speaker 738 included in the mom's closet to output an advertisement directed to the mom.

In addition, the diagram 700 includes a motion sensor 740 located in a hallway. When the motion sensor 740 detects motion of a person 744 in the hallway, the monitoring system controls a display device 742 to display a customized advertisement. The display device 742 may be an LCD display included in a monitoring panel configured to control the monitoring system.

The monitoring system may infer the identity of the person 744 in the hallway using past sensor data and select the customized advertisement based on the past sensor data. For example, in FIG. 7, the person 744 is shown as exiting the parent's room. In this example, the monitoring system detects opening of the door to the parent's room using the contact sensor 726 just prior to detecting motion of the person 744 in the hallway using the motion sensor 740. Accordingly, the monitoring system infers that the person 744 detected in the hallway in one of the parents (i.e., the dad or the mom). Based on the inference that the person 744 detected in the hallway in one of the parents, the monitoring system may select a customized advertisement directed generally to a parent.

Alternatively, the monitoring system may consider additional sensor data to infer whether the person 744 detected in the hallway is the mom or the dad. For instance, the monitoring system may determine, based on sensor data captured by the contact sensors 732 and 736, that the mom's closet was accessed less than one minute prior to the contact sensor 726 detecting opening of the door to the parent's room, but that the dad's closet was last accessed several hours prior to the contact sensor 726 detecting opening of the door to the parent's room. In this case, the monitoring system infers that the person 744 detected in the hallway is the mom and selects an advertisement directed to the mom.

Figure 8:
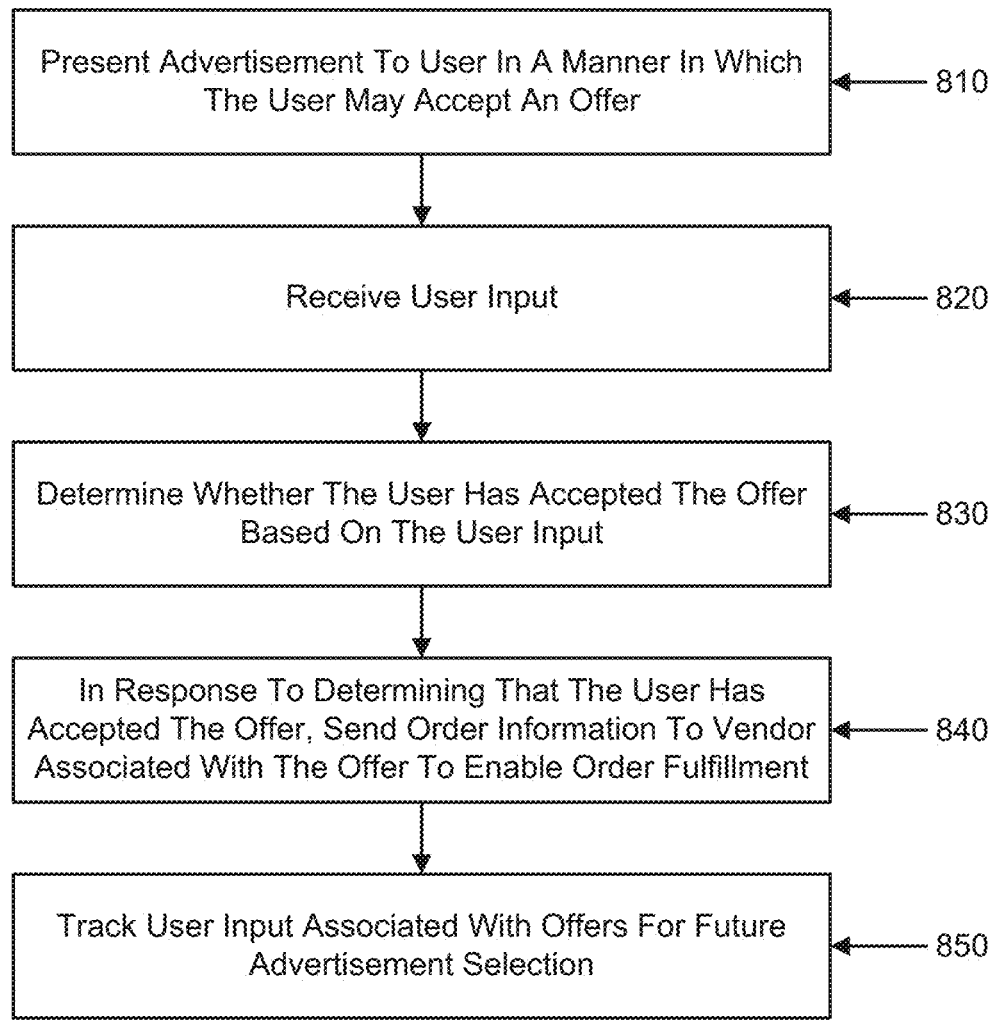
FIG. 8 is a flow chart illustrating an example of a process for coordinating order fulfillment with respect to offers presented to a customer based on sensor data.

FIG. 8 illustrates a process 800 for coordinating order fulfillment with respect to offers presented to a customer based on sensor data. The operations in flow chart 800 are described generally as being performed by a processor. In some implementations, the processor may be included in an electronic device or system configured to send and receive communications over a network. For instance, the processor may be included in a monitoring system, a monitoring application server, or another type of electronic device included in a system configured to monitor sensor data and select electronic content based on the monitored sensor data. The operations of process 800 may be performed by multiple processors included in one or more electronic devices or systems.

Figure 9:
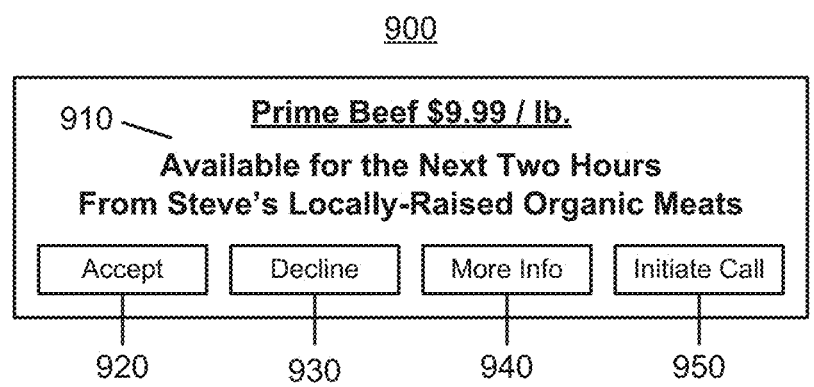
FIGS. 9 and 10 are example user interfaces for coordinating order fulfillment.

The processor presents an advertisement to a user in a manner in which the user may accept an offer (810). For instance, the processor may display the advertisement in an interactive user interface with user input controls that the user may select to accept the offer. FIG. 9 depicts an example of a user interface that may be used to display an advertisement.

Referring to FIG. 9, the processor may cause display of a user interface 900 for coordinating order fulfillment. In particular, the user interface 900 includes an advertisement presented to a user in a manner in which the user may accept an offer. The user interface 900 may be displayed on a display included in a client device that is associated with a customer of an alarm system. For instance, the user interface 900 may be displayed on an electronic display (e.g., an LCD display, a plasma display, etc.) included in an alarm panel of the alarm system or may be displayed on an electronic display included in a customer electronic device (e.g., a computer, a PDA, a smart phone, a television, etc.).

The user interface 900 includes an offer message 910. The offer message indicates parameters of an offer with which the user may accept. For example, as shown, the offer message 910 indicates that prime beef is available, for the next two hours, at $9.99/lb. from Steve's Locally-Raised Organic Meats. In this example, the offer may be made by a mobile vendor that is located in an area that is close to the alarm system and offering a particular type of product (e.g., prime beef). In this regard, the processor may compare the position of the mobile vendor to positions of alarm systems configured to receive advertisements and select alarm systems that are within a threshold distance of the mobile vendor. The selected alarm systems may dynamically change as the position of the mobile vendor changes and the offer may be good for a limited period of time (e.g., a time in which the mobile vendor is scheduled to be in an area within a threshold distance of an alarm system). The offer may be associated with any type of vendor (e.g., an Internet vendor, a mobile vendor, a delivery service, a brick and mortar store, etc.) and may be for any type of item.

The user interface 900 also includes an accept offer input control 920, a decline offer input control 930, a more information input control 940, and an initiate call input control 950. The input controls 920 to 950 may be interface buttons configured to receive user selections and provide a signal to the processor based on received user selections. When the accept offer input control 920 is selected by a user, the processor initiates a process to fulfill the offer based on the user's acceptance. When the decline offer input control 930 is selected by a user, the processor removes the user interface 900 from the display and takes no action with respect to the offer presented to the user. When the more information input control 940 is selected by a user, the processor gathers more information related to the offer and presents the gathered information to the user. The gathered information may include more detailed information related to the offer, ratings of a good or service provider included in the offer, statistics indicating whether other users have accepted the offer, or any other type information related to the offer. When the initiate call input control 950 is selected by a user, the processor initiates a process that results in a call between the user and the good or service provider. By arranging a call (e.g., using a two-way voice interface of the alarm system) between the user and the good or service provider, the user may ask the good or service provider questions related to the offer and may negotiate changes to parameters of the offer with the good or service provider and may accept a modified offer.

The processor receives, from the user, user input related to the offer (820). For instance, the processor receives user input based on the user's interaction with the interface 900 and the input controls 920 to 950. The processor may receive other types of user input (e.g., voice commands) related to the offer.

The processor determines whether the user has accepted the offer based on the user input related to the offer (830). The processor analyzes the user input and determines whether the user input indicates a desire to accept the offer. As discussed above with respect to FIG. 9, the processor may determine that the user input indicates a desire to accept the offer, decline the offer, receive more information related to the offer, or initiate a phone call to a vendor making the offer.

In response to determining that the user has accepted the offer, the processor sends order information to a vendor associated with the offer to enable order fulfillment (840). For instance, the processor may send offer acceptance information to the vendor to enable the vendor to fulfill the order. The offer acceptance information may include customer information and parameters of the offer accepted by the customer to enable the vendor to provide the good or service to the customer and receive compensation from the customer accordingly. The processor also may, upon acceptance of the offer, coordinate a phone call (or other communication session) between the customer and the vendor to enable the customer to confirm offer acceptance with the vendor and provide the vendor with any information that the vendor needs to fulfill the order. The processor further may provide an order confirmation message to the customer to confirm that the order is being fulfilled by the vendor.

Figure 10:
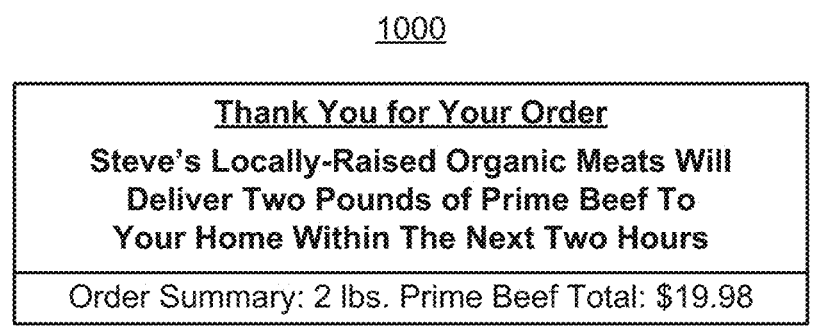

Referring to FIG. 10, the processor also may cause display of a user interface 1000 for coordinating order fulfillment. In particular, the user interface 1000 indicates that the offer has been accepted and is being fulfilled. The user interface 1000 may be displayed on a display included in a client device that is associated with a customer of an alarm system. For instance, the user interface 1000 may be displayed on an electronic display (e.g., an LCD display, a plasma display, etc.) included in an alarm panel of the alarm system or may be displayed on an electronic display included in a customer electronic device (e.g., a computer, a PDA, a smart phone, a television, etc.).

The user interface 1000 includes an order confirmation message that indicates that the offer has been accepted and that provides information related to fulfillment of the offer. For example, as shown, the order confirmation message indicates that Steve's Locally-Raised Organic Meats will deliver two pounds of prime beef to the user's home within the next two hours. The order confirmation message also indicates a quantity of the good ordered (e.g., two pounds) and a price of the good ordered. The processor may dynamically update the order confirmation message by, for example, reducing the estimated delivery time as the vendor approaches the user's home.

The processor tracks user input associated with presented offers for future advertisement selection (850). For instance, the processor may store user input related to the user's response to offers presented to user. The stored user input may reflect the type of offer, the parameters of the offer, and whether the user accepted or declined the offer. The processor may analyze the stored user input to determine what types of offers the user prefers to receive and what types of offers the user does not prefer. In this regard, for future offers and advertisements, the processor may be able to select offers and advertisements similar to the types of offers the user prefers and avoid types of offers the user does not prefer.

In further implementations, a system may be configured to provide personalized advertising content through a security system interface. The system communicates personalized electronic advertising content to a security system that monitors a building (e.g., a user's home) and the security system displays or otherwise communicates the advertising content to persons in the building being monitored by the security system (e.g., using an LCD display, a speaker, etc.). Users of the security system may receive free or reduced fee security monitoring services by agreeing to have advertisements displayed through the security system and/or by using advertisements displayed through the security system. The LCD messaging capability on many appliances, such as a security system, a microwave oven, an oven, a thermostat, or a refrigerator, may be leveraged in providing advertising content to generate additional revenue by providing relevant, desired advertising content to a home or business owner or occupant.

For instance, security systems may be expensive to install and many customers may not be able to pay the full cost of a system installation. To enable service, security system providers may offer the system at a highly subsidized price in hopes of recovering the investment that has been made in the security equipment and installation by charging the customer a relatively high monthly service charge. Customers may be limited to those who can afford either a high upfront expense for installation or a high recurring monthly service fee. Other customers may be prevented from receiving the peace of mind enabled by a security system. In this regard, if a user agrees to allow the security system provider to use sensor data derived from the security system to drive personalized advertising content, the security system provider may be able to offer the security system to the user for a reduced fee because the security system provider may be able to gain additional advertising revenue to offset the reduced fees for the security system installation and/or security monitoring services.

Figure 11:
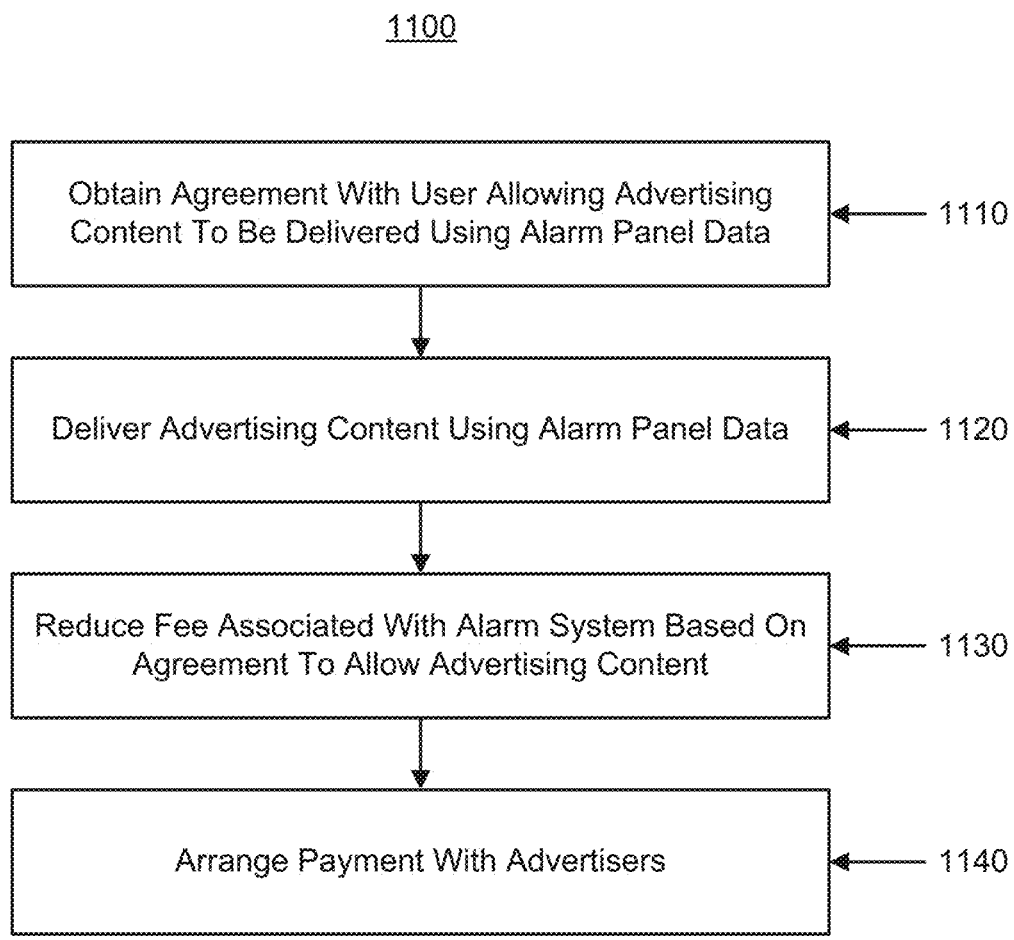
FIG. 11 is a flow chart illustrating an example of a process for providing a reduced fee associated with an alarm system based on an agreement of a customer to allow advertising content to be presented to the customer based on alarm system data.

FIG. 11 illustrates a process 1100 for providing a reduced fee associated with an alarm system based on an agreement of a customer to allow advertising content to be presented to the customer based on alarm system data. The operations in flow chart 1100 are described generally as being performed by a processor. In some implementations, the processor may be included in an electronic device or system configured to send and receive communications over a network. For instance, the processor may be included in a monitoring system, a monitoring application server, or another type of electronic device included in a system configured to monitor sensor data and select electronic content based on the monitored sensor data. The operations of process 1100 may be performed by multiple processors included in one or more electronic devices or systems.

The processor obtains an agreement with a user allowing advertising content to be delivered using alarm system data (1110). The processor may receive data communications indicating that the user agrees to allow advertising content to be delivered using alarm system data. For instance, the processor receives, either directly or via a network, customer agreement information entered by the customer through an interface (e.g., a Web interface). The processor also may receive customer agreement information from another electronic device, through an electronic message (e.g., email message) sent by the customer, or based on input entered by a data entry technician entering information received from the customer in printed form or in voice communications. The customer agreement information may include an agreement reached during installation or registration of an alarm system offered by a monitoring service provider. In some examples, the customer agreement information may include an agreement to receive advertising content through an alarm system interface, an agreement to use alarm system sensor data in targeting advertisements to the user through other communication mediums, and/or an agreement to allow the alarm service provider to provide sensor data and/or attributes of the user determined based on sensor data to a third party source to enable the third party source to target advertisements to the user.

The customer agreement information also may include the reduced fee the user is receiving by agreeing to allow advertising content to be delivered using alarm system data. The reduced fee may be a reduced installation fee, a reduced security monitoring fee, and/or a reduced fee for additional services offered by the alarm system provider (e.g., a reduced fee for two-way voice capability, a reduced fee for custom threat alerting, etc.).

The customer agreement information also may reflect user selection between different tiers of advertising agreements. As one example, a user may be able to select between four tiers of advertising agreements. A first tier may provide no advertising content to be delivered using alarm system data and a full price for a security monitoring fee. A second tier may allow a single advertisement to be delivered on an LCD interface of the alarm system each day for a first reduced security monitoring fee that is lower than the full price. A third tier may allow three advertisements to be delivered based on alarm system data each day through any communication medium chosen by the alarm service provider for a second reduced security monitoring fee that is lower than the first reduced security monitoring fee. A fourth tier may allow an unlimited number advertisements to be delivered based on alarm system data each day through any communication medium chosen by the alarm service provider and may allow the alarm service provider to provide sensor data and/or attributes of the user determined based on sensor data to a third party source to enable the third party source to target advertisements to the user. Agreement to the fourth tier may result in no fee for security monitoring services.

In some implementations, a user of the security system may, via various user input mechanisms, permit the security system operator to provide advertising content through an output device (e.g., the LCD display) of the security system. For example, the user may allow the security system operator (e.g., an intermediary alarm server) to provide the user with one coupon each day for services, meals, or merchandise in their local zip code.

The processor delivers advertising content using the alarm system data (1120). For example, the processor may deliver advertising content using the alarm system data using any of the techniques described above for delivering personalized, relevant advertising content.

The processor reduces a fee associated with the alarm system based on the agreement to allow advertising content to be delivered using the alarm system data (1130). For instance, the processor may reduce an installation fee for the user, reduce a security monitoring fee for the user, and/or reduce a fee for additional services offered by the alarm system provider (e.g., a reduced fee for two-way voice capability, a reduced fee for custom threat alerting, etc.). The processor also may track the delivery of advertising content to ensure the user is complying with the agreement prior to agreeing to reduce the fee associated with the alarm system.

The processor arranges payment with advertisers (1140). For example, the processor provides bills to the advertisers based on provision of advertising using the alarm system data and according to advertising agreements between the advertisers and the alarm service provider. The alarm service provider may choose to share advertising revenue with a security service provider (e.g., a security system equipment provider and/or security monitoring station), or the equipment manufacturer, or the customer. The alarm service provider (e.g., an alarm or content server) may offer advertisers an opportunity to pay per notification for distribution of their coupon or promotion, or alternatively, allow the advertiser to participate in an auction process whereby the advertiser bids for the right to have their notification delivered to the customer. The alarm service provider may choose to charge the advertiser when a notification is delivered, when receipt of a notification is confirmed by a customer recipient by pushing a button on a control panel, or when a customer responds to the notification (e.g., uses a coupon) by contacting the advertiser and using the promotion which was presented to the subscriber in the notification.

In some implementations, the customer may be able to pay for some or all of their security service fees by simply using the valuable advertising coupons that are presented to them on some recurring frequency on the user's security control panel. In this way, the security system provider (e.g., a security system equipment provider and/or security monitoring station) and the security subscription operator (e.g., an alarm or content server) may be able to offer the customer far more affordable security services allowing them to obtain the peace of mind and safety. The customer may be able to pay for some or all of their security service fees by simply allowing advertisements to be presented through the user's security system. The system may be configured such that a user of the security system may not be able to turn an advertisement off once the advertisement has begun playing.

In further implementations, video content analysis may be fused with sensor content to generate relevant content or actions. Using video analytics, a processor may determine things like the weather outside (e.g., with outdoor cameras, or cameras pointed outside), whose car is in the driveway, how old the car is, whether it might need a wash, who is actually in the house, whether they seem hurried or relaxed (e.g., if the customer allows analysis of the video images of the customer), how many people reside there, who visits often, and potentially even things like what ingredients they use when cooking and whether or not the jar of mayonnaise just used is nearly full or nearly empty. Electronic content may be selected and delivered based on any information derived using video content analysis.

In additional implementations, a mobile vendor may be fused with profiles of property owners and current attributes of the mobile vendor. With the profiles developed about a property or a user, mobile vendors may be able to offer enhanced services. For instance, without profile based targeting, an ice cream man may be driving through a neighborhood ringing his bell and hoping that children might come out. Using profile based targeting, instead, the ice cream man may drive through the neighborhood and have an ice cream advertisement indicating the ice cream man's presence on the street presented to all of the homeowners on the street, or to the homeowners who are home, or to the ones who have children, or to the ones who are home and have children and have previously responded to advertisements from the ice cream man.

In other examples, different mobile vendors also may use profile based targeting described throughout the disclosure. For example, a mobile vendor may be selling bio-diesel fuel, or allowing at-home ATM withdrawals, or filling prescription drugs to those who need renewals, or providing fresh meat and vegetables for dinner, or restocking dad's beer fridge. The mobile vendor drives through the neighborhood, broadcasting his advertisement to the monitoring application server. The monitoring application server then determines who is home, who has a dad that might crave beer, whose car is nearly depleted of bio-diesel fuel, which households seem to prepare fresh meals at home, etc., with such determinations made by observing sensor data from sensors included in a monitoring system, and potentially analyzing video from the property. Having identified targets of local customers that may be interested in a product of the mobile vendor, the monitoring application server presents advertisements from the mobile vendor to identified homes on electronic displays (e.g., touch screen displays), perhaps accompanied by a chime.

The described systems, methods, and techniques may be implemented in digital electronic circuitry, computer hardware, or in combinations of these elements and software. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A monitoring application server for using data related to a monitoring system to deliver personalized relevant content, the monitoring application server comprising:
   at least one processor; and
   at least one computer-readable storage medium coupled to the at least one processor having stored thereon instructions which, when executed by the at least one processor, causes the at least one processor to perform operations comprising:
      accessing sensor data collected by a monitoring system, the monitoring system being located at a property of a customer and including one or more sensors configured to sense attributes at the property;
      selecting, from among a list of display interfaces, a presentation device based on the accessed sensor data;
      determining, based on the accessed sensor data, one or more attributes to use in selecting electronic content, the one or more attributes including at least one of:
         an attribute of a user of the monitoring system,
         a room designation attribute,
         a timing attribute, or
         a sensor measurement;
      selecting, from among multiple options, electronic content to deliver to the customer based on the one or more determined attributes; and
      triggering presentation of the selected electronic content on the selected presentation device,
      wherein selecting, from among the list of display interfaces, the presentation device based on the accessed sensor data comprises:
         using the accessed sensor data to determine whether the customer is located at the property; and
         based on a determination that the user is not located at the property, selecting a portable device as the presentation device for the content.

2. The monitoring application server of claim 1, wherein selecting, from among the list of display interfaces, the presentation device based on the accessed sensor data comprises selecting at least one of a monitoring system LCD display, a PDA, a phone, a Web-based interface, or a television display.

3. The monitoring application server of claim 1, wherein selecting, from among the list of display interfaces, the presentation device based on the accessed sensor data comprises:
   comparing locations of the display interfaces to a location of an event indicated as being detected in the accessed sensor data; and
   based on comparison results, selecting the presentation device included in the monitoring system that is closest to the detected event.

4. The monitoring application server of claim 1:
   wherein determining, based on the accessed sensor data, one or more attributes to use in selecting electronic content comprises determining, based on the accessed sensor data, an attribute of a user of the monitoring system; and
   wherein selecting, from among multiple options, the electronic content to deliver to the customer based on the one or more determined attributes comprises selecting the electronic content to deliver to the customer based on the determined attribute of the user of the monitoring system.

5. The monitoring application server of claim 4:
   wherein determining, based on the accessed sensor data, the attribute of the user of the monitoring system comprises determining, based on the accessed sensor data, a short term attribute of the user that relates to current physical behavior associated with the user; and
   wherein selecting the electronic content to deliver to the customer based on the determined attribute of the user of the monitoring system comprises selecting the electronic content to deliver to the customer based on the determined short term attribute of the user.

6. The monitoring application server of claim 4:
   wherein determining, based on the accessed sensor data, the attribute of the user of the monitoring system comprises determining, based on the accessed sensor data, a long term attribute of the user that relates to one or more physical attributes associated with the user monitored over time; and
   wherein selecting the electronic content to deliver to the customer based on the determined attribute of the user of the monitoring system comprises selecting the electronic content to deliver to the customer based on the determined long term attribute of the user.

7. The monitoring application server of claim 1:
   wherein determining, based on the accessed sensor data, one or more attributes to use in selecting electronic content comprises determining, based on the accessed sensor data, a room designation attribute; and
   wherein selecting, from among multiple options, the electronic content to deliver to the customer based on the one or more determined attributes comprises selecting the electronic content to deliver to the customer based on the determined room designation attribute.

8. The monitoring application server of claim 1:
wherein determining, based on the accessed sensor data, one or more attributes to use in selecting electronic content comprises determining, based on the accessed sensor data, a timing attribute; and
wherein selecting, from among multiple options, the electronic content to deliver to the customer based on the one or more determined attributes comprises selecting the electronic content to deliver to the customer based on the determined timing attribute.

9. The monitoring application server of claim 1:
wherein determining, based on the accessed sensor data, one or more attributes to use in selecting electronic content comprises determining, based on the accessed sensor data, a sensor measurement; and
wherein selecting, from among multiple options, the electronic content to deliver to the customer based on the one or more determined attributes comprises selecting the electronic content to deliver to the customer based on the determined sensor measurement.

10. A method for using data related to a monitoring system to deliver personalized relevant content, the method comprising:
accessing sensor data collected by a monitoring system, the monitoring system being located at a property of a customer and including one or more sensors configured to sense attributes at the property;
selecting, from among a list of display interfaces, a presentation device based on the accessed sensor data;
determining, based on the accessed sensor data, one or more attributes to use in selecting electronic content, the one or more attributes including at least one of:
an attribute of a user of the monitoring system,
a room designation attribute,
a timing attribute, or
a sensor measurement;
selecting, from among multiple options, electronic content to deliver to the customer based on the one or more determined attributes; and
triggering presentation of the selected electronic content on the selected presentation device,
wherein selecting, from among the list of display interfaces, the presentation device based on the accessed sensor data comprises:
using the accessed sensor data to determine whether the customer is located at the property; and
based on a determination that the user is not located at the property, selecting a portable device as the presentation device for the content.

11. The method of claim 10, wherein selecting, from among the list of display interfaces, the presentation device based on the accessed sensor data comprises selecting at least one of a monitoring system LCD display, a PDA, a phone, a Web-based interface, or a television display.

12. The method of claim 10, wherein selecting, from among the list of display interfaces, the presentation device based on the accessed sensor data comprises:
comparing locations of the display interfaces to a location of an event indicated as being detected in the accessed sensor data; and
based on comparison results, selecting the presentation device included in the monitoring system that is closest to the detected event.

13. The method of claim 10:
wherein determining, based on the accessed sensor data, one or more attributes to use in selecting electronic content comprises determining, based on the accessed sensor data, an attribute of a user of the monitoring system; and
wherein selecting, from among multiple options, the electronic content to deliver to the customer based on the one or more determined attributes comprises selecting the electronic content to deliver to the customer based on the determined attribute of the user of the monitoring system.

14. The method of claim 13:
wherein determining, based on the accessed sensor data, the attribute of the user of the monitoring system comprises determining, based on the accessed sensor data, a short term attribute of the user that relates to current physical behavior associated with the user; and
wherein selecting the electronic content to deliver to the customer based on the determined attribute of the user of the monitoring system comprises selecting the electronic content to deliver to the customer based on the determined short term attribute of the user.

15. The method of claim 13:
wherein determining, based on the accessed sensor data, the attribute of the user of the monitoring system comprises determining, based on the accessed sensor data, a long term attribute of the user that relates to one or more physical attributes associated with the user monitored over time; and
wherein selecting the electronic content to deliver to the customer based on the determined attribute of the user of the monitoring system comprises selecting the electronic content to deliver to the customer based on the determined long term attribute of the user.

16. The method of claim 10:
wherein determining, based on the accessed sensor data, one or more attributes to use in selecting electronic content comprises determining, based on the accessed sensor data, a room designation attribute; and
wherein selecting, from among multiple options, the electronic content to deliver to the customer based on the one or more determined attributes comprises selecting the electronic content to deliver to the customer based on the determined room designation attribute.

17. The method of claim 10:
wherein determining, based on the accessed sensor data, one or more attributes to use in selecting electronic content comprises determining, based on the accessed sensor data, a timing attribute; and
wherein selecting, from among multiple options, the electronic content to deliver to the customer based on the one or more determined attributes comprises selecting the electronic content to deliver to the customer based on the determined timing attribute.

18. The method of claim 10:
wherein determining, based on the accessed sensor data, one or more attributes to use in selecting electronic content comprises determining, based on the accessed sensor data, a sensor measurement; and
wherein selecting, from among multiple options, the electronic content to deliver to the customer based on the one or more determined attributes comprises selecting the electronic content to deliver to the customer based on the determined sensor measurement.

* * * * *